United States Patent
Hirano et al.

(10) Patent No.: US 7,527,351 B2
(45) Date of Patent: May 5, 2009

(54) IMAGE FORMING APPARATUS, LIQUID DISCHARGING HEAD, IMAGE FORMING METHOD, RECORDED MATTER, AND RECORDING LIQUID

(75) Inventors: Masanori Hirano, Kanagawa (JP); Yoshihisa Ohta, Tokyo (JP); Masakazu Yoshida, Kanagawa (JP); Shigeaki Kimura, Shizuoka (JP); Naoya Morohoshi, Shizuoka (JP); Tomohiro Inoue, Kanagawa (JP); Takahiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/880,966

(22) Filed: Jul. 24, 2007

(65) Prior Publication Data
US 2008/0024536 A1    Jan. 31, 2008

(30) Foreign Application Priority Data

| Jul. 25, 2006 | (JP) | ............................. 2006-202210 |
| Sep. 20, 2006 | (JP) | ............................. 2006-254493 |
| Nov. 8, 2006  | (JP) | ............................. 2006-302451 |

(51) Int. Cl.
*B41J 2/155* (2006.01)
(52) U.S. Cl. .......................................... 347/42; 347/49
(58) Field of Classification Search .................. 347/40, 347/42, 49
See application file for complete search history.

(56) References Cited

U.S. PATENT DOCUMENTS

| 5,469,199 | A | * | 11/1995 | Allen et al. .................. 347/42 |
| 5,619,241 | A |   | 4/1997  | Hosoi et al. |
| 5,861,900 | A | * | 1/1999  | Lu et al. ...................... 347/43 |
| 5,923,348 | A | * | 7/1999  | Cunnagin et al. ............. 347/42 |
| 6,172,689 | B1 |  | 1/2001  | Cunnagin et al. |
| 6,312,081 | B1 |  | 11/2001 | Ohtsu |
| 6,578,944 | B1 |  | 6/2003  | Kamei et al. |
| 7,083,247 | B2 |  | 8/2006  | Yoshida et al. |
| 7,229,166 | B2 | * | 3/2007 | Tomioka et al. ............. 347/100 |
| 2005/0062774 | A1 | | 3/2005 | Kusunoki |
| 2006/0181562 | A1 | | 8/2006 | Hirano et al. |
| 2007/0064031 | A1 | | 3/2007 | Nakano et al. |
| 2007/0085869 | A1 | | 4/2007 | Hirano et al. |
| 2007/0091135 | A1 | | 4/2007 | Hosaka et al. |
| 2007/0106962 | A1 | | 5/2007 | Sakakibara et al. |

FOREIGN PATENT DOCUMENTS

| EP | 1518678 | 3/2005 |
| JP | 5-261939 | 10/1993 |
| JP | 3015036 | 12/1999 |
| JP | 2003-266667 | 9/2003 |

(Continued)

OTHER PUBLICATIONS

Oct. 23, 2008 European search report in connection with a counterpart European patent Application No. 07 25 2842.

*Primary Examiner*—Thinh H Nguyen
(74) *Attorney, Agent, or Firm*—Cooper & Dunham, LLP

(57) ABSTRACT

A disclosed image forming apparatus includes a line-type liquid discharging head including nozzles configured to jet liquid droplets. The nozzles are aligned in a sheet width direction. The line-type liquid discharging head includes plural nozzle rows each including an alignment of a plurality of the nozzles configured to discharge liquid droplets of the same color. A distance L1 between the nozzle rows is $L1 = T1 1 \times V1$, where T1 is a liquid transfer amount impregnating time of a standard sheet and V1 is a sheet conveying speed.

21 Claims, 14 Drawing Sheets

FOREIGN PATENT DOCUMENTS

| | | |
|---|---|---|
| JP | 2004-74611 | 3/2004 |
| JP | 2005-1303 | 1/2005 |
| JP | 2005-89713 | 4/2005 |
| JP | 2005-177990 | 7/2005 |
| JP | 2005-205828 | 8/2005 |
| JP | 2006-88604 | 4/2006 |
| JP | 3807429 | 5/2006 |
| JP | 2006-281767 | 10/2006 |

* cited by examiner

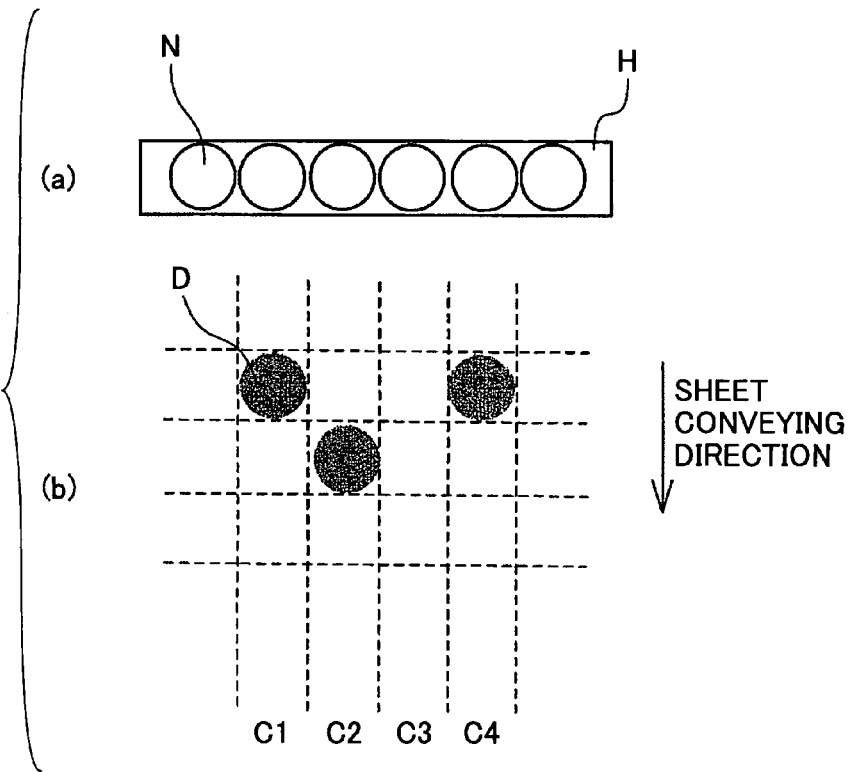
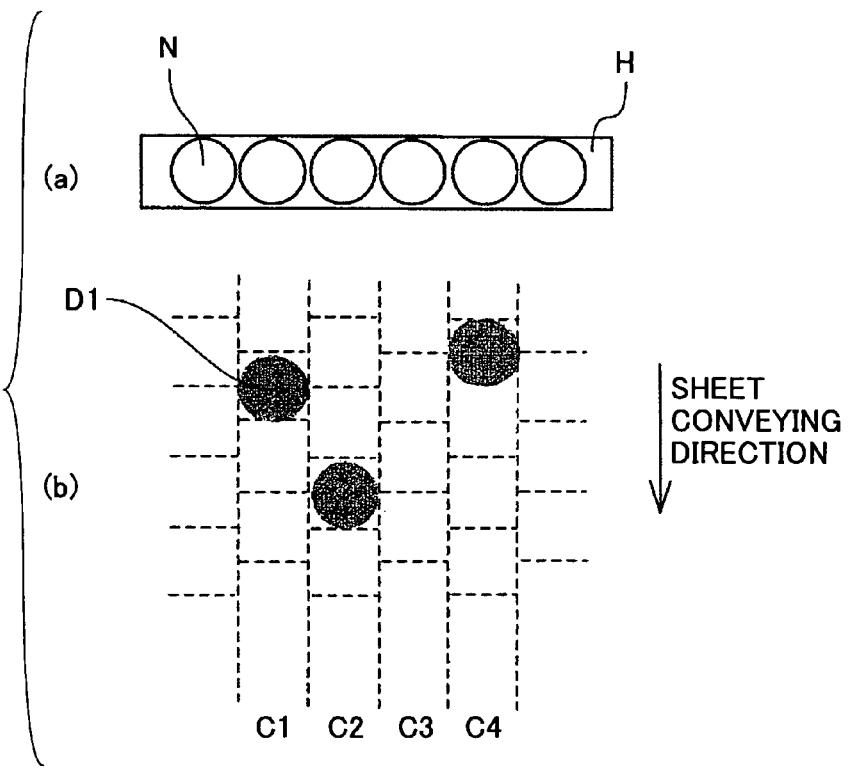

IMAGE FORMING APPARATUS, LIQUID DISCHARGING HEAD, IMAGE FORMING METHOD, RECORDED MATTER, AND RECORDING LIQUID

BACKGROUND

1. Technical Field

This disclosure relates generally to image forming apparatuses, liquid discharging heads, image forming methods, recorded matter, and recording liquid.

2. Description of the Related Art

Generally, printers, facsimile machines, copiers, plotters, and image forming apparatuses in which plural functions of the aforementioned devices are combined in a single apparatus are configured to perform image formation (recording, printing, imaging, character printing are also used as synonyms). One method of image formation is performed by using a liquid discharging device including a recording head configured with a liquid discharging head that discharges (jets) liquid droplets of recording liquid (hereinafter, also referred to as "ink"). The recording liquid is caused to adhere to a medium (hereinafter, also referred to as a "sheet" made of any material; recording medium, transfer material, recording sheet are also used as synonyms) while the sheet is being conveyed.

An "image forming apparatus" refers to an apparatus that performs image formation by discharging (jetting) liquid onto media such as paper, threads, fiber, cloth, leather, metal, plastic, glass, wood, ceramics, etc. "Image formation" not only refers to forming images with some meaning such as characters or figures onto a medium but also forming images without meaning onto a medium, such as patterns. "Liquid" is not limited to recording liquid and ink; it can be any kind of fluid to be discharged such as a DNA sample, resist, and pattern material. A "liquid discharging device" is any device that discharges liquid through its liquid discharging head, and is not limited to a device for forming an image.

There are several issues to be addressed by an inkjet recording apparatus, which is an example of an image forming apparatus including such a liquid discharging device. The first issue is recording speed. In a so-called serial-type inkjet recording apparatus, a recording head that is narrower than the width of a recording sheet scans the sheet many times and discharges liquid to perform recording. This is a method of recording with "lines", which is considerably disadvantageous in terms of recording speed compared to the electrophotographic printing method or the offset printing method of recording in units of pages, i.e., with "planes".

In an attempt to resolve such a disadvantage in speed, the cycle of ejecting liquid droplets has been increased and the recording head has been enlarged, so that a larger area is recorded in each scanning operation and recording can be completed with fewer scanning operations. As a result of such an attempt, there is known a line-type inkjet recording apparatus employing line-type heads, in which nozzles are provided across the width of a sheet in such a manner as to cover the entire recording area of the sheet.

Patent Document 1: Japanese Laid-Open Patent Application No. 2004-074611

With this line-type inkjet recording apparatus, the sheet only needs to be passed through once to complete the recording operation. Accordingly, the recording speed is many times higher than that of conventional serial-type inkjet recording apparatuses, thus considerably eliminating the disadvantage in terms of speed.

The second issue pertains to cost of sheets (recording medium). By using so-called paper dedicated for inkjet printing, superior image reproducibility can be attained, with considerably high-quality recorded images that are comparable with photographs.

However, inkjet-dedicated paper is generally expensive, and therefore, offices subjected to severe cost cutting are hesitant to purchase such sheets. Furthermore, in cases of printing for commercial purposes where a large amount of printouts are required, it is extremely disadvantageous if high-quality images can be achieved only with inkjet-dedicated paper.

Accordingly, the composition of ink has been modified so that high-quality images can be achieved even with plain paper (copier paper) that is heavily used in offices. For example, there have been attempts to develop dye-based ink with low permeability, to use a fixing auxiliary agent, and to develop pigment-based ink. As a result, in recent years and continuing, the same level of image quality as that of a laser printer can be attained by using plain paper, i.e., copier paper, which is generally used in offices.

In image forming apparatuses employing an electrophotographic method, coloring material is heat-fixed onto sheets. However, in inkjet recording apparatuses, coloring material is fixed onto sheets with the use of permeation and moisture evaporation. The permeation process is accompanied by various problems and restrictions.

As described above, the quality of images recorded on plain paper has improved significantly. However, this does not apply to every type of sheet. In particular, on sheets that cannot sufficiently absorb ink, the overflowing unabsorbed ink often becomes solid and forms undesirable irregularities (beading phenomenon).

In order to jet ink onto such sheets, a conventional approach is to perform a multi-path recording method in which the recording operation is divided into plural paths, so that sufficient time can be spent on drying the ink. Even on a sheet with inferior absorbency, the overflowing ink can be fixed without solidifying by providing enough waiting time for moisture to evaporate and drying to progress.

However, in the line-type inkjet recording apparatus where recording speed is given high priority, it is difficult to provide enough waiting time for drying. Although it is possible to decrease the recording speed and the sheet conveying speed even in the line-type inkjet recording apparatus so as to provide sufficient drying time, this runs counter to the original purpose of the line-type inkjet recording apparatus of increasing the recording speed.

Patent document 2 discloses a technology for increasing the drying speed by heating the sheet. Specifically, there is provided a first drying unit arranged on the upstream side of line heads to heat-dry the recording medium from the side on which an image is not to be recorded (hereinafter, "non-recording side"). A second drying unit is arranged on the downstream side of the line heads to heat-dry the recording medium from the non-recording side after printing. A third drying unit is arranged facing the second drying unit to heat-dry the recording medium from the side on which the image is recorded in a non-contact manner.

Patent Document 2: Japanese Laid-Open Patent Application No. 2005-001303

Patent Document 3 discloses a line-type inkjet recording apparatus that performs multi-path recording. Specifically, a recording unit intermittently performs recording while the recording heads are moved to predetermined positions in an orthogonal direction and a recording sheet is conveyed backward and/or forward in the sheet conveyance direction. A procedure of conveying the sheet for a predetermined number of times is repeated for a predetermined number of times until an image is recorded on the entire recording sheet.

Patent Document 3: Japanese Laid-Open Patent Application No. 2005-205828

However, by installing a heating unit such as the heater described in Patent Document 2, the sheet may be curled due to the difference in expansivity on the side of the sheet with ink and the other side of the sheet without ink. If the sheet curls during the recording operation, the sheet may contact the heads. As a result, the sheet may be soiled, or in the worst case, the sheet may become caught in the heads and cause a paper jam that would stop the mechanism. Meanwhile, in the multi-path recording method described in patent document 3, the high speed of the line-type inkjet recording apparatus is disadvantageously decreased.

SUMMARY

In an aspect of this disclosure an image forming apparatus, a liquid discharging head, an image forming method, and recorded matter are provided in which a beading phenomenon is prevented without decreasing the recording speed, and recording liquid is provided with which images can be formed without causing a beading phenomenon.

In an exemplary embodiment of this disclosure an image forming apparatus includes a line-type liquid discharging head including nozzles configured to jet liquid droplets, the nozzles being aligned in a sheet width direction, wherein the line-type liquid discharging head includes plural nozzle rows each including an alignment of a plurality of the nozzles configured to jet liquid droplets of the same color; and a distance L1 between the nozzle rows is $L1=T1\times V1$, where T1 is a liquid transfer amount impregnating time of a standard sheet and V1 is a sheet conveying speed.

In another exemplary embodiment of this disclosure, an image forming method is provided for forming an image using a line-type liquid discharging head including nozzles configured to jet liquid droplets, the nozzles being aligned in a sheet width direction, the image forming method including the step of forming the image by using the line-type liquid discharging head including plural nozzle rows each including an alignment of a plurality of the nozzles configured to jet liquid droplets of the same color, wherein a distance L1 between the nozzle rows is $L1=T1\times V1$, where T1 is a liquid transfer amount impregnating time of a standard sheet and V1 is a sheet conveying speed.

BRIEF DESCRIPTION OF THE DRAWINGS

Other objects, features and advantages of the present invention will become more apparent from the following detailed description when read in conjunction with the accompanying drawings, in which:

FIG. 13 illustrates an example where dot positions are not shifted by half a resolution;

FIG. 14 illustrates an example where dot positions are shifted by half a resolution;

DETAILED DESCRIPTION OF THE PREFERRED EMBODIMENTS

A description is given, with reference to the accompanying drawings, of an embodiment of the present invention.

Figure 1:
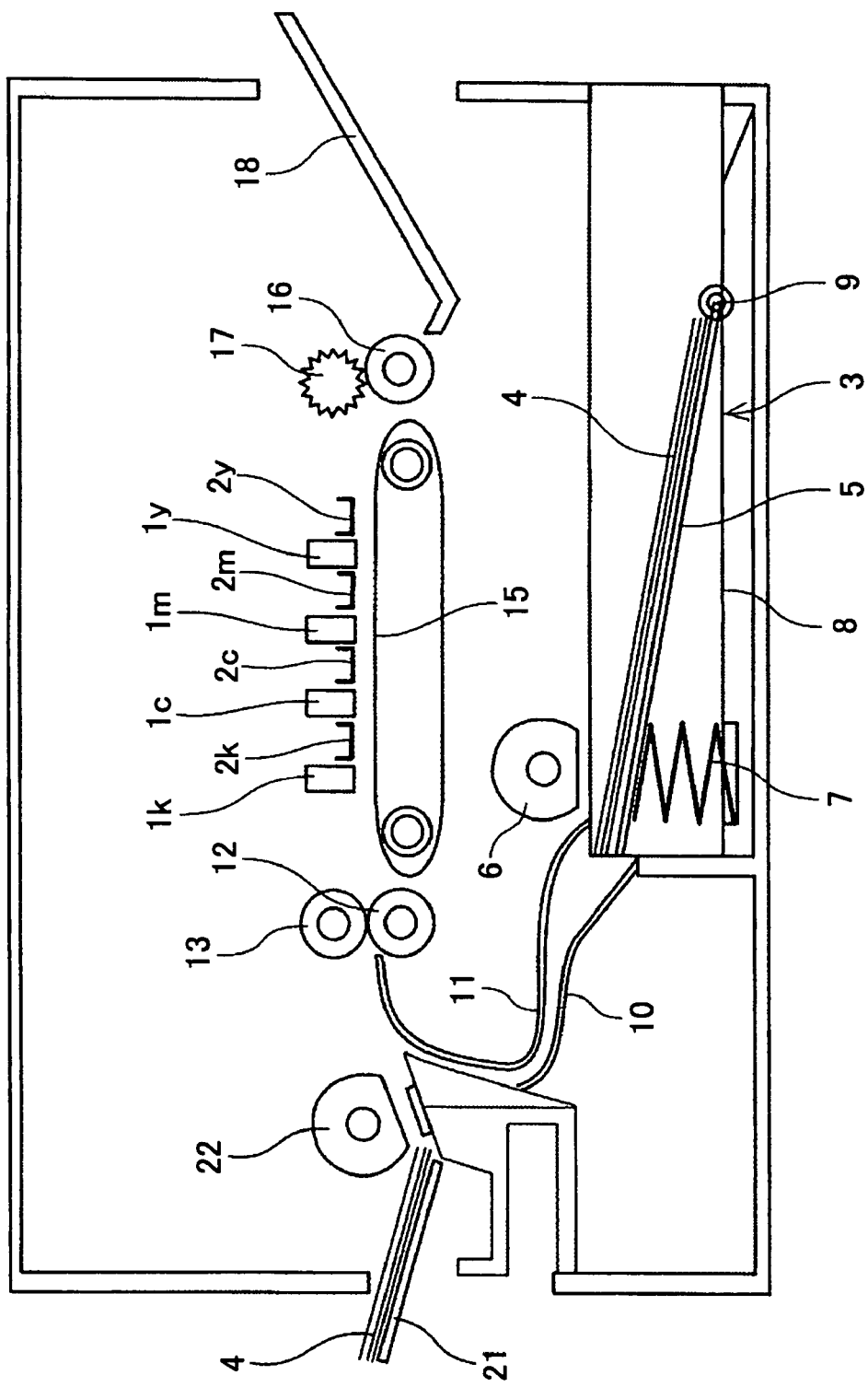
FIG. 1 is an image forming apparatus according to an embodiment of the present invention.

An example of an image forming apparatus according to an embodiment of the present invention is described with reference to FIG. 1. The image forming apparatus includes liquid discharging heads according to an embodiment of the present invention, employs recording liquid according to an embodiment of the present invention, forms images by an image forming method according to an embodiment of the present invention, and generates recorded matter according to an embodiment of the present invention. FIG. 1 is a schematic diagram of the overall structure of the image forming apparatus.

This image forming apparatus is a line-type image forming apparatus provided with recording heads that are full-line type liquid discharging heads with nozzle rows (in which nozzles are arranged) that are longer than the width of the printing area of a medium.

Figure 2:
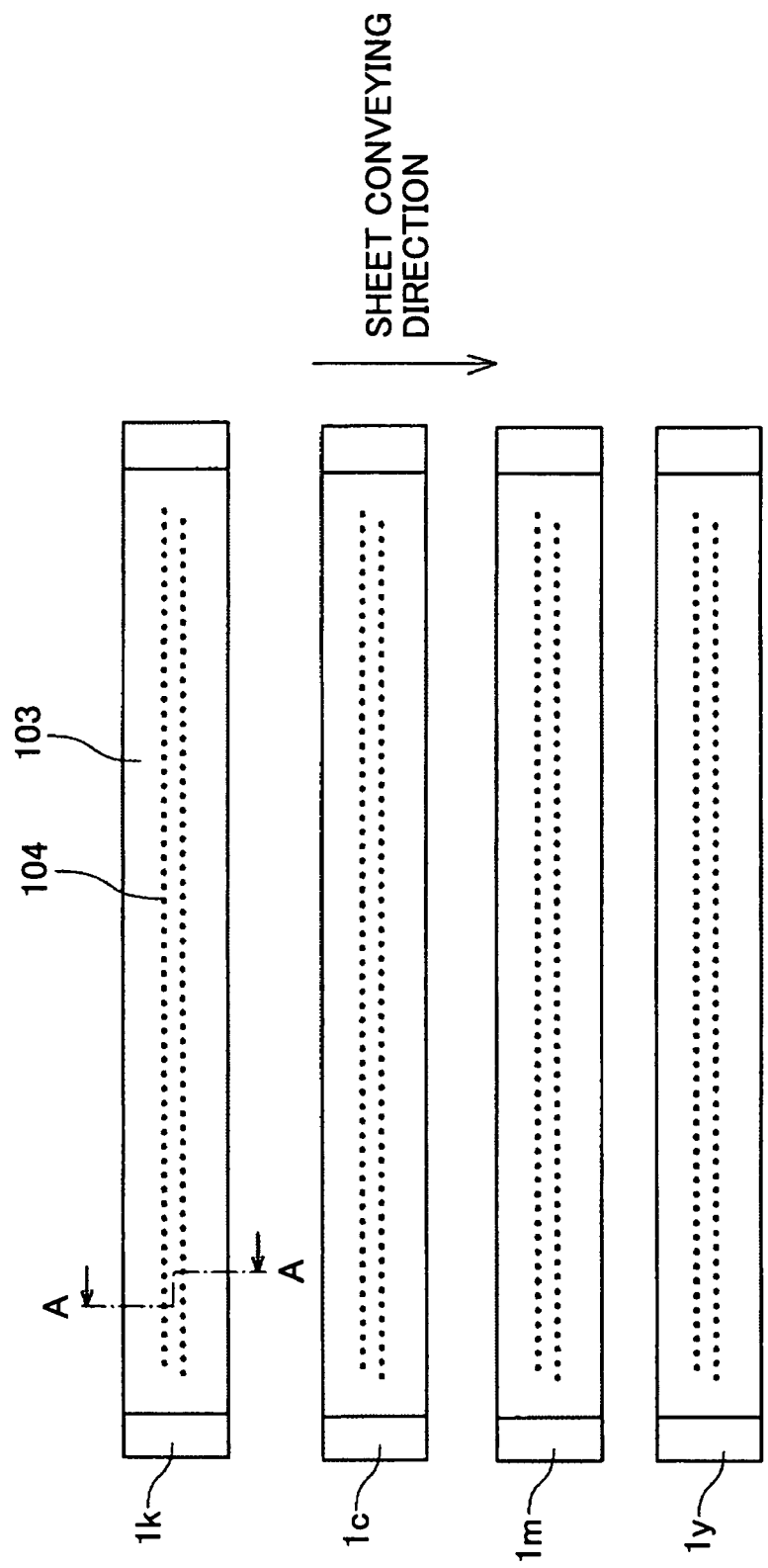
FIG. 2 illustrates recording heads of the image forming apparatus shown in FIG. 1.

As shown in FIG. 2, the image forming apparatus includes four recording heads 1k, 1c, 1m, 1y (simply referred to as "recording head 1" when the colors are not distinguished), which are liquid discharging heads according to an embodiment of the present invention. The recording heads 1k, 1c, 1m, 1y discharge (jet) liquid droplets of black (K), cyan (C), magenta (M), and yellow (Y), respectively. Each of the recording heads 1 includes a not shown head holder for holding nozzles 104, with the side provided with the nozzles facing downward.

The image forming apparatus includes maintenance/recovery mechanisms 2 (2k, 2c, 2m, and 2y), each corresponding to one of the recording heads 1. The maintenance/recovery mechanism 2 is provided for the purpose of maintenance and recovery of the performance of the recording head. During a maintenance operation for the head performance, such as a purge process or a wiping process, the recording head 1 and the maintenance/recovery mechanism 2 are caused to move relatively to each other, so that a capping member included in the maintenance/recovery mechanism 2 faces the nozzle side of the recording head.

The recording heads 1 are arranged in such a manner as to discharge liquid droplets of black, cyan, magenta, and yellow, in this order from the upstream side of the sheet conveyance direction; however, the arrangement and the number of colors are not limited thereto.

A sheet feeding tray 3 includes a bottom plate 5 on which sheets 4 are mounted and a sheet feeding roller (semilunar roller) 6. The bottom plate 5 is rotatable about a rotational shaft 9 that is attached to a base 8, and is pushed against the sheet feeding roller 6 by a pressurizing spring 7. In order to prevent double feeding (where plural sheets are conveyed together) of the sheets 4, a separating pad (not shown) is arranged facing the sheet feeding roller 6. The separating pad is made of a material with a high friction coefficient, such as artificial leather or cork. Furthermore, a not shown release cam is provided for releasing the abutment of the bottom plate 5 and the sheet feeding roller 6.

Guide members 10, 11 are provided for guiding the sheet 4 fed from the sheet feeding tray 3 toward the portion between a conveying roller 12 and a pinch roller 13.

The conveying roller 12 is rotated by a not shown driving source, and conveys the sheet 4 received from the guide members 10, 11 toward a platen 15 facing the recording heads 1. The platen 15 can have a rigid structure or can be a conveying belt, as long as it can maintain the gap between the recording heads 1 and the sheet 4.

On the downstream side of the platen 15, a sheet ejecting roller 16 for ejecting the sheet 4 on which an image is formed and a spur 17 facing the sheet ejecting roller 16 are provided. The sheet ejecting roller 16 ejects the sheet 4 on which an image is formed to a sheet eject tray 18.

On the side opposite to the sheet eject tray 18, there is a manual sheet feeding tray 21 for manually feeding the sheet 4 and a sheet feeding roller 22 for feeding the sheet 4 placed on the manual sheet feeding tray 21. The sheet 4 fed from the manual sheet feeding tray 21 is guided by the guide member 11 toward the portion between the conveying roller 12 and the pinch roller 13.

In the image forming apparatus, in a standby status, the release cam is pushing down the bottom plate 5 of the sheet feeding tray 3 to a predetermined position, so that the abutment between the bottom plate 5 and the sheet feeding roller 6 is released. In such a status, as the conveying roller 12 is rotated, this rotational driving force is transferred to the sheet feeding roller 6 and the not shown release cam by a not shown gear. As a result, the release cam is separated from the bottom plate 5 so that the bottom plate 5 rises, the sheet feeding roller 6 and the sheets 4 contact each other, sheet feeding starts as the sheet feeding roller 6 rotates and picks up the sheets 4, and the sheets 4 are individually separated from each other by a separating claw.

As the sheet feeding roller 6 rotates, the sheet 4 is guided by the guide members 10, 11 toward the portion between the conveying roller 12 and the pinch roller 13, and the conveying roller 12 sends the sheet 4 onto the platen 15. Subsequently, the trailing edge of the sheet 4 faces the D-cut portion of the sheet feeding roller 6 and abutment between the sheet 4 and the sheet feeding roller 6 is released. In between the sheet feeding roller 6 and the conveying roller 12, it is possible to provide a pair of conveying rollers as supplementary units.

Liquid droplets are discharged from the recording heads 1 onto the sheet 4 conveyed onto the platen 15 in the above described manner, to form an image. The sheet 4 onto which the image is formed is ejected by the sheet ejecting roller 16 onto the sheet eject tray 18. The speed of sheet conveyance and the timings of discharging liquid droplets at the time of image formation are controlled by a not shown control unit.

Figure 3:
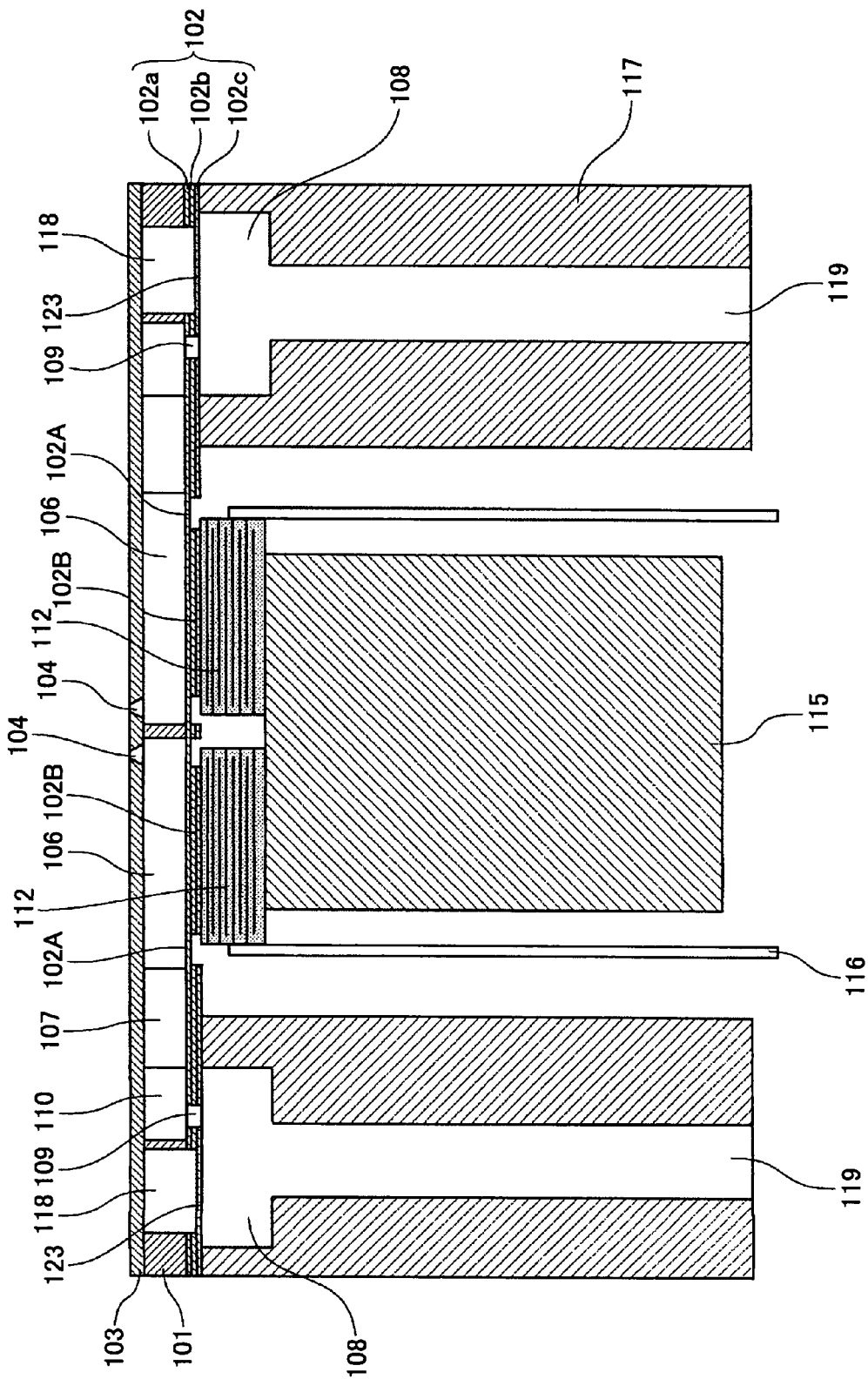
FIG. 3 is a sectional view in a lengthwise direction of liquid chambers in a liquid discharging head shown in FIG. 2.
Figure 4:
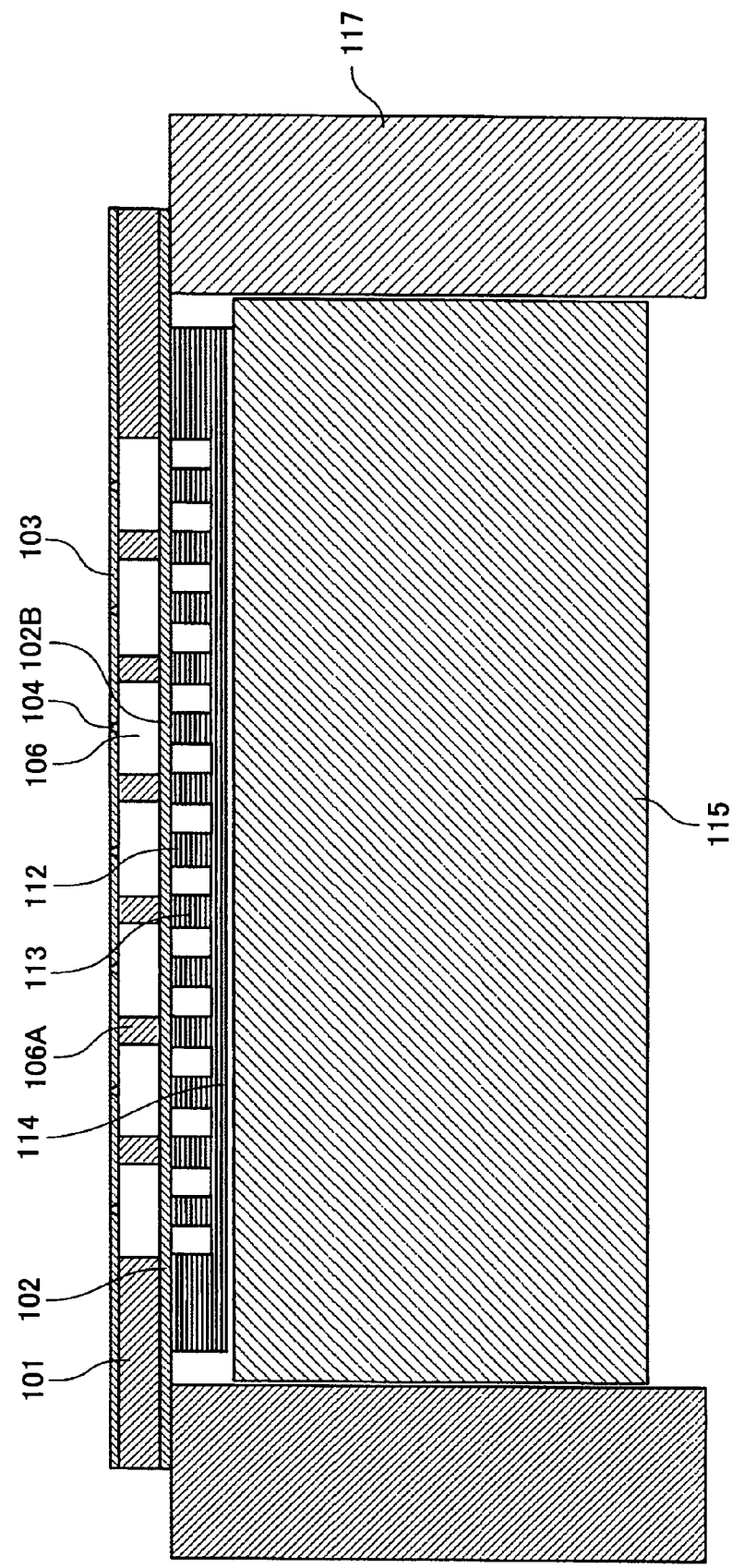
FIG. 4 is a sectional view in a widthwise direction of the liquid chambers.

An example of a liquid discharging head acting as the recording head 1 is described with reference to FIGS. 3 and 4. FIG. 3 is a sectional view in a lengthwise direction of liquid chambers in the liquid discharging head (direction orthogonal to the direction in which nozzles are arranged) and FIG. 4 is a sectional view in a widthwise direction of the liquid chambers (direction in which nozzles are arranged).

The liquid discharging head includes a flow path plate (liquid chamber substrate) 101, an oscillating plate 102 bonded to the bottom surface of the flow path plate 101, and a nozzle plate 103 bonded to the top surface of the flow path plate 101 (or formed integrally with the flow path plate 101). These plates form pressurizing liquid chambers 106 (also referred to as pressure chamber pressurizing chamber, flow path, etc.) communicating with nozzles 104 through which liquid droplets are discharged, fluid resistance units 107 also acting as supplying paths for supplying liquid ink (recording liquid) to the pressurizing liquid chambers 106, and damper chambers 118.

An SUS substrate is subjected to etching with the use of acid etching liquid or machine work such as punching, in order to form openings in the flow path plate 101, such as the pressurizing liquid chambers 106, the fluid resistance units 107, and the damper chambers 118. As described above, the flow path plate 101 and the nozzle plate 103 or the oscillating plate 102 can be formed as a single integral unit by an electroforming method. It is also possible to use a single-crystal silicon substrate of a crystal face orientation (110) formed by performing anisotropic etching with the use of alkaline etching liquid such as potassium hydroxide aqueous solution (KOH), or other types of photosensitive resin.

As shown in FIG. 3, the oscillating plate 102 is formed with three layers of nickel plates including a first layer 102*a*, a second layer 102*b*, and a third layer 102*c*, provided in this order from the pressurizing liquid chamber 106. The oscillating plate 102 is fabricated by, for example, an electroforming method. The oscillating plate 102 can be a laminated member including a resin member such as polyimide and a metal plate such as an SUS substrate, or a resin member.

The nozzle plate 103 has multiple nozzles 104 each corresponding to one of the pressurizing liquid chambers 106, and the nozzle plate 103 is bonded to the flow path plate 101 with an adhesive. The nozzle plate 103 can be made of metal such as stainless steel or nickel, resin such as a polyimide resin film, silicon, or a combination of any of the above. The internal shape of the nozzle 104 is a horn shape (it can also be a substantially cylindrical shape or a substantially truncated cone shape), and the hole diameter of the nozzle 104 is approximately 20 μm through 30 μm at the ink droplet outlet side. Furthermore, the nozzle pitch in each row is 150 dpi.

The nozzle side of the nozzle plate 103 (the side from which ink is discharged: discharge side) has a not shown water repellent layer whose surface is water repellent. The water repellent layer is provided with a water repellent film selected based on physical properties of the recording liquid. For example, the water repellent film is formed by electrocoating a PTFE-Ni eutectoid coat or fluorocarbon resin, or applying and then baking a solvent of silicon-based resin or fluorocarbon-based resin. Accordingly, the shapes of droplets and scattering properties of the recording liquid are stabilized, thereby achieving high quality images.

As shown in FIG. 3, the oscillating plate 102 includes a diaphragm part 102A formed with the first layer 102*a*, and a two-layered protruding part 102B including the second layer 102b and the third layer 102c formed in the middle of the diaphragm part 102A, each corresponding to one of the pressurizing liquid chambers 106. A piezoelectric element 112 acting as a pressure generating unit (actuator unit) is bonded to each protruding part 102B. Furthermore, a column 113 is bonded to the three-layered part (thick part 102B), corresponding to a partition wall 106A of each pressurizing liquid chamber 106.

The piezoelectric elements 112 and the columns 113 are formed in a stacked piezoelectric element member 114. Specifically, the stacked piezoelectric element member 114 is subjected to a slit process involving half-cut dicing in such a manner as to be divided into a comb-like shape. Although the columns 113 are also piezoelectric elements, they merely act as columns because no driving voltages are applied. The stacked piezoelectric element member 114 is bonded to a base member 115.

The piezoelectric element 112 (stacked piezoelectric element member 114) includes piezoelectric layers made of lead zirconate titanate (PZT) having a thickness of 10 μm through 50 μm per layer and internal electrode layers made of silver palladium (AgPd) having a thickness of several μm per layer, which layers are laminated alternately. The internal electrodes are alternately electrically connected to individual electrodes that are edge face electrodes (external electrodes) on an edge face and common electrodes. Driving signals are supplied to these electrodes via an FPC cable 116.

The recording liquid in the pressurizing liquid chamber 106 can be pressurized by use of displacement in a d33 direction of the piezoelectric element 112 as the piezoelectric direction. The recording liquid in the pressurizing liquid chamber 106 can also be pressurized by using displacement in a d31 direction of the piezoelectric element 112 as the piezoelectric direction. In the present embodiment, the displacement in the d33 direction is used.

The base member 115 can be made of a metal material. If the base member 115 is made of a metal material, it is possible to prevent heat accumulation caused by self-heating of the piezoelectric element 112. The piezoelectric element 112 and the base member 115 are bonded together by an adhesive. However, in the case of a line-type head with multiple channels, the temperature rises to nearly 100° C. due to self-heating of the piezoelectric element 112. As a result, the bonding strength decreases considerably. Furthermore, the temperature inside the head increases due to self-heating, which increases the temperature of the ink. If the temperature of the ink rises, the ink viscosity decreases, which has a significant impact on ejection properties. Thus, by forming the base member 115 with a metal material so as to prevent heat accumulation caused by self-heating of the piezoelectric element 112, it is possible to prevent the bonding strength from decreasing and the ejection properties from degrading due to decreased viscosity of the recording liquid.

A frame member 117 is bonded to the oscillating plate 102 with an adhesive. The frame member 117 is made of, e.g., epoxy-based resin or polyphenylene sulfide by injection molding. In the frame member 117, a common liquid chamber 108 for supplying recording liquid to the pressurizing liquid chambers 106 is formed. The recording liquid is supplied from the common liquid chamber 108 through a supply outlet 109 formed in the oscillating plate 102 to a flow path 110 formed on the upstream side of the fluid resistance unit 107, and then to the pressurizing liquid chamber 106 via the fluid resistance unit 107. The frame member 117 also has a recording liquid supplying outlet 119 for supplying recording liquid to the common liquid chamber 108 from outside.

The oscillating plate 102 acts as parts of a wall of the common liquid chamber 108 and also as a wall of the pressurizing liquid chamber 106. The part of the oscillating plate 102 forming parts of the wall of the common liquid chamber 108 also acts as a damper part 123, which damper part 123 acts as a wall between the damper chamber 118 adjacent to the common liquid chamber 108. Thus, the damper part 123 absorbs pressure variations in the common liquid chamber 108. The damper chamber 118 is open to the atmosphere through a not shown atmosphere opening path.

In the liquid discharging head configured as above, by decreasing the voltage applied to the piezoelectric element 112 from a standard voltage, the piezoelectric element 112 contracts. As a result, the oscillating plate 102 is moved downward and the volume of the pressurizing liquid chamber 106 increases, so that ink flows into the pressurizing liquid chamber 106. Subsequently, by increasing the voltage applied to the piezoelectric element 112, the piezoelectric element 112 expands in the thickness direction of the layers. As a result, the oscillating plate 102 is moved upward toward the nozzle 104 and the volume of the pressurizing liquid chamber 106 decreases, so that the recording liquid inside the pressurizing liquid chamber 106 is pressurized and discharged (jetted) through the nozzle 104.

By changing the voltage applied to the piezoelectric element 112 back to the standard voltage, the oscillating plate 102 is moved back to its original position and the pressurizing liquid chamber 106 expands, so that negative pressure is generated. Accordingly, recording liquid from the common liquid chamber 108 fills the pressurizing liquid chamber 106. After the oscillation of the meniscus surface of the nozzle 104 stops, the liquid discharging head prepares for the next operation of discharging liquid droplets.

The method of driving the head is not limited to the above example (pull-push ejection method). By changing the driving waveform, a pull ejection method or a push ejection method can be performed.

The above-described liquid discharging head is a piezoelectric-type head in which a piezoelectric element is employed as the pressure generating unit (actuator unit). The recording head 1 can be a liquid discharging head employing another type of actuator unit, such as a thermal-type head employing a heating element as the actuator unit or an electrostatic head employing an oscillating plate generating an electrostatic force and an electrode as the actuator unit.

Figure 5:
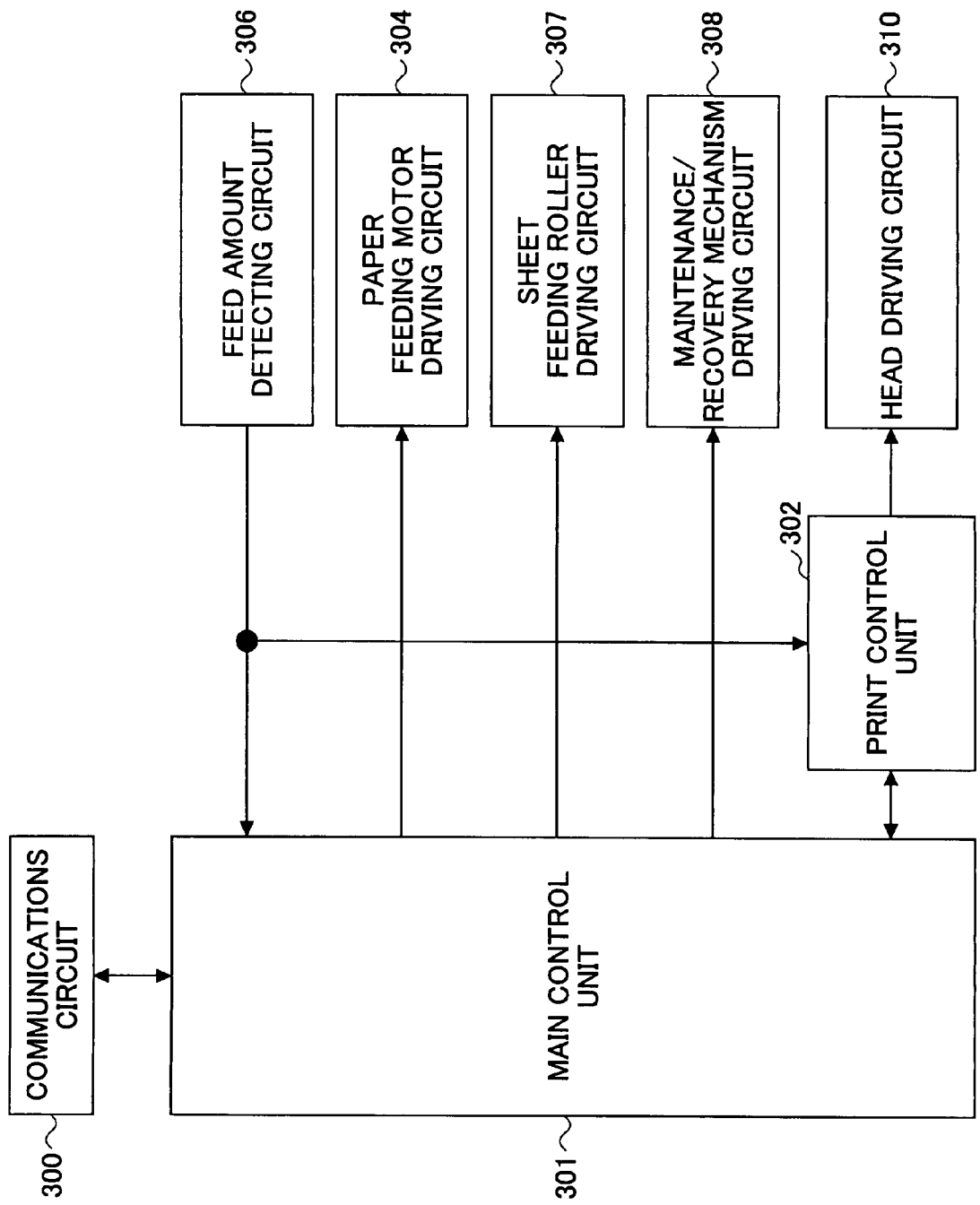
FIG. 5 is a block diagram of a control unit of the image forming apparatus shown in FIG. 1.

Next, an example of the control unit of the image forming apparatus is described with reference to a block diagram shown in FIG. 5.

The control unit includes a main control unit 301 and a print control unit 302. The main control unit 301 is a microcomputer that controls all units of the image forming apparatus, and also acts as a control unit for controlling an idle ejection operation according to an embodiment of the present invention. The print control unit 302 is a microcomputer that controls printing operations.

In order to form an image on the sheet 4 based on print process information received from a communications circuit 300, the main control unit 301 rotates the conveying roller 12 by controlling a not shown paper feeding motor via a paper feeding motor driving circuit 304 and sends print data to the print control unit 302.

The main control unit 301 receives detection signals from a feed amount detecting circuit 306 that detects the movement amount of the conveying roller 12. Based on the detection signals, the main control unit 301 controls the movement amount and the movement speed of the conveying roller 12. The feed amount detecting circuit 306 uses a photosensor to detect and count the number of slits of a rotational encoder sheet attached to a rotational shaft of the conveying roller 12 in order to detect the movement amount (i.e., sheet feed amount). Based on the movement amount received from the main control unit 301, the paper feeding motor driving circuit 304 rotates the paper feeding motor to rotate the conveying roller 12, thereby conveying the sheet 4 to a predetermined position at a predetermined speed.

The main control unit 301 rotates the sheet feeding roller 6 once by sending a sheet feeding roller driving command to a sheet feeding roller driving circuit 307. The main control unit 301 drives a driving source of a not shown head holder and the maintenance/recovery mechanism 2 via a maintenance/recovery mechanism driving circuit 308 for the maintenance/recovery operation of the recording head 1.

Based on the signals received form the main control unit 301 and the sheet feed amount received from the feed amount detecting circuit 306, the print control unit 302 generates data for driving the pressure generating unit for ejecting liquid droplets from the recording head 1, transfers this data to a head driving circuit 310, and outputs to the head driving circuit 310 various signals necessary for transferring image data and determining the transfer of the image data. The print control unit 302 includes a driving waveform generating unit including a D/A converter for D/A converting pattern data of driving signals loaded in a ROM, a voltage amplifier, and a current amplifier. The print control unit 302 further includes a driving waveform selecting unit for selecting the driving waveform to be provided to the head driver. With the use of the above, the print control unit 302 generates a driving waveform including a single driving pulse (driving signal) or plural driving pulses (driving signals), and outputs the driving waveform to the head driving circuit 310.

Based on data received from the print control unit 302, the head driving circuit 310 selectively applies driving signals included in the driving waveform received from the print control unit 302 to a driving element (such as the aforementioned piezoelectric element) that generates energy for causing liquid droplets to be ejected from the recording head 1, thereby driving the recording head 1.

Next, a description is given of coated paper for commercial/publication printing, which is recording medium used as the standard sheet according to an embodiment of the present invention.

Commercial/publication-use coated paper includes coated paper for offset printing or gravure printing, coated paper for electrophotographic recording, and inkjet recording coated paper developed for commercial/publication printing.

The commercial/publication-use coated paper as the recording medium includes a base, a coating layer coating at least one side of the base, and other layers provided according to need.

The amount of ink acting as the recording liquid transferred to (impregnating into) the recording medium during a contact time (time during which the liquid contacts the recording medium) of 100 ms is 4 ml/m$^2$ through 15 ml/m$^2$, more preferably 6 ml/m$^2$ through 14 ml/m$^2$, as measured with a dynamic scanning liquid absorption meter. Furthermore, the amount of pure water transferred to the recording medium during a contact time of 100 ms is preferably 4 ml/m$^2$ through 26 ml/m$^2$, more preferably 8 ml/m$^2$ through 25 ml/m$^2$, as measured with the dynamic scanning liquid absorption meter. If the amount of ink or pure water being transferred to the recording medium during a contact time of 100 ms is too small, a beading phenomenon is likely to occur; if the amount is too large, the diameter of ink dots produced by the recording operation may be too small.

The amount of ink transferred to the recording medium during a contact time of 400 ms is 7 ml/m$^2$ through 20 ml/m$^2$, more preferably 8 ml/m$^2$ through 19 ml/m$^2$, as measured with the dynamic scanning liquid absorption meter. Furthermore, the amount of pure water transferred to the recording medium during a contact time of 400 ms is 5 ml/m$^2$ through 29 ml/m$^2$, more preferably 10 ml/m$^2$ through 28 ml/m$^2$, as measured with the dynamic scanning liquid absorption meter. If the amount of ink or pure water being transferred to the recording medium during a contact time of 400 ms is too small, drying properties are insufficient, and therefore, spur traces are likely to remain; if the amount is too large, then a bleeding phenomenon is likely to occur, which may decrease the glossiness of the image after drying.

The dynamic scanning liquid absorption meter (dynamic scanning absorptometer; DSA, Japan TAPPI (Technical Association of the Pulp and Paper Industry) Journal, Vol. 48, May, 1994, pages 88-92, by Shigenori Kuga) is a device that can precisely measure the amount of liquid absorption within an extremely short amount of time. This dynamic scanning liquid absorption meter can automatically perform measurement by directly reading the speed of liquid absorption from the movement of a meniscus in a capillary, turning the sample into a disk shape, scanning a liquid absorption head above this sample in a spiral manner, automatically changing the scanning speed according to a predetermined pattern, and measuring a necessary number of points with one sample. A liquid supplying head for supplying liquid to a paper sample is made to contact the capillary via a Teflon (registered trademark) tube, and the position of the meniscus in the capillary is automatically read by an optical sensor. Specifically, a dynamic scanning liquid absorption meter (K350 series D type manufactured by Kyowa Seiko Co., Ltd.) was used to measure the amount of pure water or ink transferred into paper. The transfer amount (amount of liquid impregnating into paper) during a contact time of 100 ms and a contact time of 400 ms can be obtained by interpolating measurement values of the transfer amounts in contact times close to the respective contact times. The measurement was performed in an environment of 23° C. and 50% RH.

-Base-

The type of base is not particularly limited, and any type of base can be appropriately selected depending on the purpose. Examples are paper primarily made of wood fiber and sheet-type matter such as nonwoven fabric primarily made of wood fiber and synthetic fiber.

The type of paper is not particularly limited, and conventionally known paper can be appropriately selected depending on the purpose. Examples are wood pulp and recycled pulp. Wood pulp includes broad leaf tree bleached kraft pulp (LBKP), needle leaf tree bleached kraft pulp (NBKP), NBSP, LBSP, GP, and TMP.

Materials of recycled pulp are indicated in the recycled paper standard quality specification list of the Paper Recycling Promotion Center. Examples are white wood-free paper without printing, white wood-free paper with lines, cream wood-free paper without printing, used cards, wood-containing paper without printing, coarse paper without printing, wood-free paper with ink printing, white wood-free paper with color printing, wood-free paper with partial color printing, art paper without printing, wood-containing paper with color printing, coarse paper with color printing, newspaper, and magazine paper (including books). More specific examples are chemical pulp paper and paper including high yield pulp made from used paper of paper or paper boards, including printing paper such as uncoated computer paper that is information-related paper, heat-sensitive paper, and pressure-sensitive paper; OA recycled paper such as PPC; coated paper such as art paper, coated paper, ultra lightweight coated paper, and mat paper; and uncoated paper such as wood-free paper, color wood-free paper, notebooks, letter paper, super drop cloth, wood-free paper with ink printing, machine glazed paper, and milk cartons. These types of paper may be used singularly or in combination.

The above-described recycled pulp is manufactured by combining the four procedures described below.

(1) Solution is performed by unraveling the used paper into fiber by treating it with mechanical force of a pulper and chemicals, and removing the printed ink from the fiber.

(2) Cleaning is performed by removing foreign matter (e.g., plastic) and dirt from the used paper with a screen or a cleaner.

(3) Deinking is performed by eliminating the printed ink, which is removed from the fiber with a surface active agent, from the system by a flotation method or a washing method.

(4) Bleaching is performed by an oxidation effect or a deoxidation effect to enhance the whiteness of the fiber.

When recycled pulp is combined with non-recycled pulp, the ratio of recycled pulp is to be less than or equal to 40% to prevent sheets from curling after the recording operation.

The internal filler used in the base is, e.g., a conventionally known pigment used as a white pigment. Examples of white pigment are a white achromatic pigment such as precipitated calcium carbonate, heavy magnesium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminium hydroxide, alumina, lithopone, zeolite, magnesium carbonate, magnesium hydrate; and an organic pigment such as a styrene-based plastic pigment, an acrylic-based plastic pigment, polyethylene, microcapsules, urea resin, and melamine resin. These pigments may be used singularly or in combination.

Examples of an internal sizing agent used for making the base are, e.g., a neutral rosin-based sizing agent, alkenyl succinic anhydride (ASA), alkenyl ketene dimer (AKD), and a petroleum resin-based sizing agent. Among these, the neutral rosin sizing agent and the alkenyl succinic anhydride are particularly preferable. The alkenyl ketene dimer has high sizing efficiency, and therefore, only a small amount will suffice. However, the friction coefficient on the surface of the recording paper (media) decreases, making the paper slip easily. Accordingly, the alkenyl ketene dimer is not preferable in that problems may arise while the paper is being conveyed in an inkjet recording operation.

-Coating Layer-

The coating layer includes a pigment and a binder (binding agent), and may also include a surface active agent or other components according to need.

The pigment can be an inorganic pigment or a combination of an inorganic pigment and an organic pigment.

Examples of inorganic pigments are kaolin, talc, heavy magnesium carbonate, light magnesium carbonate, calcium sulfite, amorphous silica, titanium white, magnesium carbonate, titanium dioxide, aluminium hydroxide, calcium hydroxide, magnesium hydroxide, zinc hydroxide, and chlorite. Among these, kaolin is particularly preferable as it has superior properties in exhibiting glossiness, giving the paper a texture that is close to that of paper used for offset printing.

Examples of kaolin are delaminated kaolin, calcined kaolin, and engineered kaolin made by improving the surface. In consideration of exhibiting glossiness, preferably 50% by mass or more of the kaolin is composed of kaolin having a particle diameter distribution in which the proportion of particles with diameters of 2 μm or less is 80% by mass or more.

The additive amount of kaolin is preferably 50 pts. mass or more in 100 pts. mass of the total amount of pigment in the coating layer. If the additive amount is less than 50 pts. mass, the glossiness becomes insufficient. Although there is no particular upper limit in the additive amount, in consideration of the fluidity and thickening properties of kaolin under a particularly high shearing force, 90 pts. mass or less is preferable so that the coating layer is applied appropriately.

Examples of organic pigments are water soluble dispersions of styrene-acrylonitrile copolymer particles, styrene-butadiene copolymer particles, polystyrene particles, and polyethylene particles. Two or more of these organic pigments can be mixed together.

The additive amount of organic pigment is preferably 2 pts. mass through 20 pts. mass in 100 pts. mass of the total amount of pigment in the coating layer. Organic pigments have superior properties in exhibiting glossiness and a lower relative density than inorganic pigments. Therefore, with organic pigment, it is possible to produce a coating layer with a large volume, a high level of glossiness, and superior surface coverage. If the additive amount is less than two pts. mass, these effects cannot be achieved. If the additive amount exceeds 20 pts. mass, the fluidity of the coating liquid is degraded, which makes it difficult to apply the coating liquid, thus reducing the cost efficiency.

The particles of the organic pigment may be solid, hollow, or donut-shaped. In consideration of the balance in glossiness exhibited, surface coverage, and fluidity of the coating liquid, the average particle diameter is preferably 0.2 μm through 3.0 μm, and hollow particles each having a void ratio of 40% or more are preferably used.

The binder is preferably an aqueous resin.

Preferable examples of an aqueous resin are at least one of a water-soluble resin and a water dispersible resin. The type of water-soluble resin is not particularly limited; any type can be appropriately selected depending on the purpose. Examples are polyvinyl alcohol and modified polyvinyl alcohol such as anion-modified polyvinyl alcohol, cation-modified polyvinyl alcohol, and acetal-modified polyvinyl alcohol; polyurethane; polyvinyl pyrrolidone and modified polyvinyl pyrrolidone such as a copolymer of polyvinyl pyrrolidone and vinyl acetate, a copolymer of vinyl pyrrolidone and dimethylaminoethyl methacrylic acid, a copolymer of quaternized vinyl pyrrolidone and dimethylaminoethyl methacrylic acid, and a copolymer of vinyl pyrrolidone and methacryl amidopropyl trimethyl ammonium chloride; a cellulose such as a carboxymethyl cellulose, a hydroxyethyl cellulose, and a hydroxypropyl cellulose; a modified cellulose such as a cationized hydroxyethyl cellulose; synthetic resin such as polyester, polyacrylic acid (ester), melamine resin, or modifications thereof, or a copolymer of polyester and polyurethane; poly (meta) acrylic acid, poly (meta) acrylamide, oxidized starch, phosphoric esterified starch, autologously modified starch, cationized starch, various modified starch, polyethylene oxide, polyacrylic soda, and alginic acid soda. These types of water-soluble resin may be used singularly or in combination.

Among these, polyvinyl alcohol, cation-modified polyvinyl alcohol, acetal-modified polyvinyl alcohol, polyester, polyurethane, and a copolymer of polyester and polyurethane are particularly preferable in consideration of ink absorbability.

The type of water dispersible resin is not particularly limited; any type can be appropriately selected depending on the purpose. Examples are polyvinyl acetate, an ethylene-vinyl acetate copolymer, polystyrene, a styrene-(meta) acrylic ester copolymer, a (meta) acrylic ester-based copolymer, a vinyl acetate-(meta) acrylic (ester) copolymer, a styrene-butadiene copolymer, an ethylene-propylene copolymer, polyvinyl ether, and a silicon-acrylic-based copolymer. A crosslinking agent such as methylolized melamine, methylolized urea, methylolized hydroxyproline urea, and isocyanate can be included. The binder can have a self-crosslinking function with a copolymer including units of N-methylol acrylamide. A plurality of these types of aqueous resin can be used simultaneously.

The additive amount of aqueous resin is preferably 2 pts. mass through 100 pts. mass or more in 100 pts. mass of the total amount of pigment, and more preferably 3 pts. mass through 50 pts. mass or more. The additive amount of aqueous resin is determined in such a manner that liquid absorbability of the recording medium is within a desired range.

When a water dispersible agent is used as a coloring agent, a cationic organic compound is not necessarily required to be mixed; however there are no particular limitations and any type of water dispersible coloring agent can be appropriately selected depending on the purpose. Examples are a monomer, an oligomer, and a polymer of primary—tertiary amine and quaternary ammonium salt that react with direct dye in water-soluble ink, a sulfonic acid group in acid dye, a carboxyl group, and an amino group and produce insoluble salt. Among these, an oligomer or a polymer is preferable.

Examples of a cationic organic compound are dimethylamine epichlorohydrin polycondensation, dimethylamine ammonia polycondensation, poly (trimethyl aminoethyl methacrylate/methyl sulfate), diallyl amine hydrochloride/acrylamide copolymer, poly (diallyl amine hydrochloride/sulfur dioxide), polyallylamine hydrochloride, poly (allylamine hydrochloride/diallyl amine hydrochloride), acrylamide/diallyl amine copolymer, polyvinyl amine copolymer, cyanogen diamide, cyanogen diamide/ammonium chloride/urea/formaldehyde condensation, polyalkylene polyamine/cyanogen diamide ammonium salt condensation, dimethyldiallyl ammonium chloride, polydiallyl methylamine hydrochloride, poly (diallyldimethyl ammonium chloride), poly (diallyldimethyl ammonium chloride/sulfur dioxide), poly (diallyldimethyl ammonium chloride/diallylamine hydrochloride derivative), acrylamide/diallyldimethyl ammonium chloride copolymer, acrylate/acrylamide/diallylamine hydrochloride copolymer, polyethyleneimine, an ethyleneimine derivative such as acrylamine polymer, and modified polyethyleneimine alkylene oxide. These cationic organic compounds may be used singularly or in combination.

Among these, a dimethylamine epichlorohydrin polycondensation, a cationic organic compound of low-molecular weight such as polyallylamine hydrochloride and a cationic organic compound of a relatively high-molecular weight such as poly (diallyldimethyl ammonium chloride) are preferably used in combination. By using these in combination, the image density is increased and feathering is reduced compared to using each of these individually.

The cation equivalent weight of the cationic organic compound measured by a colloidal titration method (using polyvinyl potassium sulfate, toluidine blue) is preferably 3 meq/g through 8 meq/g. If the cation equivalent weight is within this range, preferable results can be achieved within the aforementioned dry adhering amount. In measuring the cation equivalent weight by the colloidal titration method, it is assumed that the cationic organic compound is diluted with distilled water in such a manner as to be 0.1% by mass in terms of solid content, and pH control is not performed.

The dry adhering amount of the cationic organic compound is preferably 0.3 $g/m^2$ through 2.0 $g/m^2$. If the dry adhering amount of the cationic organic compound is less than 0.3 $g/m^2$, it may not be possible to sufficiently increase the image density and reduce feathering.

The type of surface active agent is not particularly limited, and any type of surface active agent can be appropriately selected depending on the purpose. Any one of an anionic surface active agent, a cationic surface active agent, an ampholytic surface active agent, and a nonionic surface active agent can be used. The nonionic surface active agent is particularly preferable. By adding a surface active agent, the water resistance of the image is improved, the image density is increased, and the bleeding phenomenon is mitigated.

Examples of the nonionic surface active agents are a higher alcohol ethylene oxide adduct, an alkylphenol ethylene oxide adduct, a fatty acid ethylene oxide adduct, a polyhydric alcohol fatty acid ester ethylene oxide adduct, a higher fatty acid amine ethylene oxide adduct, a fatty acid amide ethylene oxide adduct, an ethylene oxide adduct of oil, a polypropylene glycol ethylene oxide adduct, fatty acid ester of glycerol, fatty acid ester of pentaerythritol, fatty acid ester of sorbitol and sorbitan, fatty acid ester of sucrose, alkylether of polyhydric alcohol, and fatty acid amide of alkanol amines. These nonionic surface active agents may be used singularly or in combination.

The type of polyhydric alcohol is not particularly limited, and any type of polyhydric alcohol can be appropriately selected depending on the purpose. Examples are glycerol, trimethylolpropane, pentaerythritol, sorbitol, and sucrose. With respect to the ethylene oxide adduct, it is effective to replace part of the ethylene oxide with alkylene oxide such as propylene oxide or butylene oxide, as long as water solubility can be maintained. The replacement ratio is preferably less than or equal to 50%. The HLB (hydrophile-lipophile balance) is preferably 4 through 15, and more preferably 7 through 13.

The additive amount of the surface active agent is preferably 0 pts. mass through 10 pts. mass in 100 pts. mass of the total amount of the cationic organic compound, more preferably 0.1 pts. mass through 1.0 pts. mass.

In the coating layer, other components can be added according to need, as long as the purpose and the effects of the present invention are not impaired. Examples of other components are additives such as alumina powder, a pH adjuster, a preservative, and an antioxidant.

The method of forming a coating layer is not particularly limited, and any method can be appropriately selected depending on the purpose. For example, the base can be impregnated with or coated by coating layer liquid. The method of causing the coating layer liquid to impregnate the base or applying the coating layer liquid is not particularly limited, and any method can be appropriately selected depending on the purpose. The coating layer liquid can be applied by using coating devices such as a conventional size press, a gate roll size press, a film transfer size press, a blade coater, a rod coater, an air knife coater, and a curtain coater. Among these, in consideration of cost, it is preferable to cause the coating layer liquid to impregnate the base or apply the coating layer liquid by using the conventional size press, the gate roll size press, or the film transfer size press, and finish the coating by an on-machine process.

The adhering amount of coating layer liquid is not particularly limited, and any amount can be appropriately selected depending on the purpose. However, the adhering amount is preferably 0.5 $g/m^2$ through 20 $g/m^2$ in terms of solid content, and more preferably 1 $g/m^2$ through 15 $g/m^2$. After impregnation or application, the coating layer liquid can be dried according to need. The drying temperature is not particularly limited, and any temperature can be appropriately selected depending on the purpose. However, the drying temperature is preferably around 100° C. through 250° C.

The recording medium used in an image forming method according to an embodiment of the present invention can be other than inkjet recording medium, such as commercially available offset printing coated paper or gravure printing coated paper, as long as the liquid absorption properties are within the range defined in the above embodiments of the present invention.

The basis weight of the recording medium used in the image forming method according to the embodiment of the present invention is preferably 50 g/m$^2$-250 g/m$^2$. If the basis weight is less than 50 g/m$^2$, the paper will not have enough body, and therefore, the recording medium may get caught in the middle of the conveying path, thus causing conveyance failures. If the basis weight exceeds 250 g/m$^2$, the paper will have excessive body, and therefore, the recording medium may not pass through a curved part in the middle of the conveying path and get caught, thus causing conveyance failures.

Next, a description is given of ink used as recording liquid according to an embodiment of the present invention. The composition of this recording liquid determines the liquid transfer amount impregnating time (the time required for liquid to impregnate the paper).

The ink used in the image forming method according to an embodiment of the present invention includes at least water, a coloring agent, and a wetting agent. Other components such as a penetrating agent and a surface active agent can be added according to need.

The surface tension of the ink at 25° C. is 15 mN/m through 40 mN/m, more preferably 20 mN/m through 35 mN/m. If the surface tension is less than 15 mN/m, an excessive amount of ink wets the nozzle plate of the liquid discharging head according to an embodiment of the present invention. Thus, the ink cannot be discharged in a stable manner. As a result, ink droplets cannot be successfully formed (particle formation) or considerable bleeding occurs on the recording medium used in the image forming method according to an embodiment of the present invention. If the surface tension exceeds 40 mN/m, the ink is not sufficiently absorbed in the recording medium, which may lead to a beading phenomenon and may require more time to dry.

The surface tension is measured at 25° C. with, e.g., a surface tension measuring device (manufactured by Kyowa Interface Science Co., Ltd. CVP-Z), by using a platinum plate.

-Coloring Agent-

The coloring agent included in the ink is preferably at least one of a pigment, dye, and coloring particles.

A preferable example of coloring particles is a water dispersion of polymer particles including a color material of at least either one of a pigment or dye.

The above-described "including a color material" refers to either one or both of an emulsion where the color material is enclosed in a polymer particle and an emulsion where the color material is adhering to the surface of the polymer particle. All of the coloring material mixed in the ink does not necessarily need to be enclosed in the polymer particle or adhering to the polymer particle. Part of the coloring material can be dispersed in the emulsion, as long as the effects of the present invention are not impaired. The coloring material can be water-insoluble or poorly water-soluble. The type of coloring material is not particularly limited, and any type of coloring material can be appropriately selected depending on the purpose, as long as the coloring material can adhere to the polymer.

"Water-insoluble or poorly water-soluble" means that in an environment of 20° C., the coloring material dissolves by no more than 10 pts. mass in 100 pts. mass of water. "Dissolve" means that a separated or submerged coloring material is not visually observed in the surface layer or the bottom layer of the aqueous solution.

The volume average particle diameter of a polymer particle (coloring particle) including the coloring material is preferably 0.01 μm through 0.16 μm in the ink. If the volume average diameter is less than 0.01 μm, the particles are inclined to flow, and therefore, a considerable bleeding phenomenon occurs in the characters and/or light resistance is degraded. If the volume average particle diameter exceeds 0.16 μm, the nozzles are inclined to be clogged and/or color developing properties are degraded.

Examples of the coloring agent are dye such as water-soluble dye, oil-soluble dye, and dispersed dye, and a pigment. Oil-soluble dye and dispersed dye are preferable in terms of achieving good adsorptivity and enclosing properties, but a pigment is preferable in terms of forming an image with light resistance.

In order to efficiently impregnate the polymer particles, 2 grams or more of the dye is preferably dissolved in every liter of organic solvent such as a ketone-based solvent; more preferably, 20 g through 600 g of the dye is dissolved in every liter.

The water-soluble dye is classified as acid dye, direct dye, basic dye, reactive dye, and food color by a color index, and preferably has good water resistance and light resistance.

Examples of the acid dye and the food color are C.I. acid yellow 17, 23, 42, 44, 79, 142; C.I. acid red 1, 8, 13, 14, 18, 26, 27, 35, 37, 42, 52, 82, 87, 89, 92, 97, 106, 111, 114, 115, 134, 186, 249, 254, 289; C.I. acid blue 9, 29, 45, 92, 249; C.I. acid black 1, 2, 7, 24, 26, 94; C.I. food yellow 3, 4; C.I. food red 7, 9, 14; C.I. food black 1, 2.

Examples of the direct dye are C.I. direct yellow 1, 12, 24, 26, 33, 44, 50, 86, 120, 132, 142, 144; C.I. direct red 1, 4, 9, 13, 17, 20, 28, 31, 39, 80, 81, 83, 89, 225, 227; C.I. direct orange 26, 29, 62, 102; C.I. direct blue 1, 2, 6, 15, 22, 25, 71, 76, 79, 86, 87, 90, 98, 163, 165, 199, 202; C.I. direct black 19, 22, 32, 38, 51, 56, 71, 74, 75, 77, 154, 168, 171.

Examples of the basic dye are C.I. basic yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. basic red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C.I. basic blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; C.I. basic black 2, 8.

Examples of the reactive dye are C.I. reactive black 3, 4, 7, 11, 12, 17; C.I. reactive yellow 1, 5, 11, 13, 14, 20, 21, 22, 25, 40, 47, 51, 55, 65, 67; C.I. reactive red 1, 14, 17, 25, 26, 32, 37, 44, 46, 55, 60, 66, 74, 79, 96, 97; C.I. reactive blue 1, 2, 7, 14, 15, 23, 32, 35, 38, 41, 63, 80, 95.

The type of the pigment is not particularly limited, and any type of pigment can be appropriately selected depending on the purpose. For example, the pigment can be an inorganic pigment or an organic pigment.

Examples of an inorganic pigment are titanium oxide, iron oxide, calcium carbonate, barium sulfate, aluminium hydroxide, barium yellow, cadmium red, chrome yellow, and carbon black. Among these, carbon black is preferable. Carbon black is manufactured by a known method such as a contact method, a furnace method, and a thermal method.

Examples of an organic pigment are an azo pigment, a polycyclic pigment, a dye chelate, a nitro pigment, a nitroso pigment, and aniline black. Among these, an azo pigment and a polycyclic pigment are particularly preferable. Examples of an azo pigment are an azo lake pigment, an insoluble azo pigment, a condensed azo pigment, and a chelate azo pigment. Examples of a polycyclic pigment are a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate are a basic dye type chelate and an acid dye type chelate.

The color of the pigment is not particularly limited, and any color can be appropriately selected depending on the purpose. Examples are a pigment for black and a pigment for other colors. These pigments may be used singularly or in combination.

Examples for a pigment for black are carbon blacks (C.I. pigment black 7) such as furnace black, lampblack, acetylene black, and channel black; metals such as copper, steel (C.I. pigment black 11), and titanium oxide; and organic pigments such as aniline black (C.I. pigment black 11).

Examples for a pigment for other colors are given below. Examples of yellow ink are C.I. pigment yellow 1 (fast yellow G), 3, 12(disazo yellow AAA), 13, 14, 17, 23, 24, 34, 35, 37, 42 (yellow iron oxide), 53, 55, 74, 81, 83(disazo yellow HR), 95, 97, 98, 100, 101, 104, 108, 109, 110, 117, 120, 128, 138, 150, 153.

Examples of magenta ink are C.I. pigment red 1, 2, 3, 5, 17, 22 (brilliant fast scarlet), 23, 31, 38, 48:2 (permanent red 2B(Ba)), 48:2 (permanent red 2B (Ca)), 48:3 (permanent red 2B(Sr)), 48:4 (permanent red 2B(Mn)), 49:1, 52:2, 53:1, 57:1 (brilliant carmine 6B), 60:1, 63:1, 63:2, 64:1, 81 (rhodamine 6G lake), 83, 88, 92, 101 (colcothar), 104, 105, 106, 108 (cadmium red), 112, 114, 122 (dimethyl quinacridone) , 123, 146, 149, 166, 168, 170, 172, 177, 178, 179, 185, 190, 193, 209, 219.

Examples of cyan ink are C.I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63.

Examples of halftone ink for red, green, and blue are C.I. pigment red 177, 194, 224, C.I. pigment orange 43, C.I. pigment violet 3, 19, 23, 37, C.I. pigment green 7, 36.

The pigment is preferably a self-dispersing pigment that can be stably dispersed without using a dispersing agent, and that has at least one hydrophilic group bonded to the surface of the pigment in a direct manner or through another atomic group. Thus, unlike conventional ink, a dispersing agent for dispersing the pigment is not required. The self-dispersing pigment preferably has ionicity, and is preferably charged to be anionic or cationic.

The volume average particle diameter of the self-dispersing pigment is preferably 0.01 μm through 0.16 μm in the ink.

Examples of the anionic hydrophilic group are —COOM, —SO$_3$M, —PO$_3$HM, —PO$_3$M$_2$, —SO$_2$NH$_2$, —SO$_2$NHCOR (where M represents a hydrogen atom, alkali metal, ammonium, or organic ammonium; R represents an alkyl group having 1 through 12 carbon atoms, a phenyl group that can have a substituent, or a naphthyl group that can have a substituent). Among these, it is preferable to use —COOM and —SO$_3$M bonded to surfaces of color pigments.

Examples of the "M" in the hydrophilic groups are given below. Examples of alkali metal are lithium, natrium, and kalium. Examples of organic ammonium are mono- or trimethyl- ammonium, mono- or triethyl- ammonium, and mono- or trimethanol-ammonium. There are various methods of achieving a color pigment that is charged to be anionic by introducing —COONa to the surface of the color pigment. Examples are oxidizing the color pigment with hypochlorous acid soda, sulfonating the color pigment, and making diazonium salt react with the color pigment.

A preferable example of the cationic hydrophilic group is a quaternized ammonium group. The following quaternized ammonium groups are more preferable, and a preferable color material has any one of these bonded to the surface of the pigment.

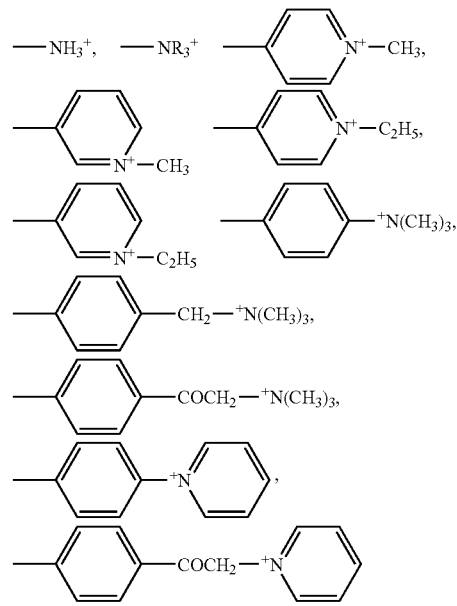

The method of manufacturing cationic self-dispersing carbon black to which a hydrophilic group is bonded is not particularly limited, and any method can be appropriately selected depending on the purpose. For example, one method of bonding an N-ethylpyridyl group expressed by the following structural formula is to treat carbon black with 3-amino-N-ethylpyridium bromide.

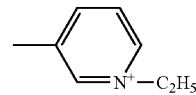

The hydrophilic group can be bonded to the surface of a carbon black particle via another atomic group. Examples of an atomic group are an alkyl group having 1 through 12 carbon atoms, a phenyl group that can have a substituent, or a naphthyl group that can have a substituent. Specific examples of the hydrophilic group being bonded to the surface of a carbon black particle via another atomic group are —C$_2$H$_4$COOM (where M represents alkali metal and quaternary ammonium), —PhSO$_3$M (where Ph expresses a phenyl group and M represents alkali metal and quaternary ammonium), and —C$_5$H$_{10}$NH$_3$+.

A pigment dispersant liquid including a pigment dispersing agent can be used as the ink used in the image forming method according to an embodiment of the present invention.

The following are examples of a pigment dispersing agent acting as a hydrophilic high polymer compound. Examples of a natural-based pigment dispersing agent are a vegetable high polymer such as gum arabic, tragacanth gum, guar gum, karaya gum, locust bean gum, arabinogalactan, pectin, and quince seed starch; a seaweed-based high polymer such as alginic acid, carageenan, and agar; an animal-based high polymer such as gelatin, casein, albumin, and collagen; and a microbial high polymer such as xanthene gum and dextran. Examples of a semi-synthetic-based pigment dispersing agent are a fiber-based high polymer such as methyl cellulose, ethyl cellulose, hydroxy ethyl cellulose, hydroxy propyl cellulose, and carboxymethyl cellulose; a starch-based high polymer such as glycolic acid sodium starch and phosphate ester sodium starch; and a seaweed-based high polymer such as sodium alginate and propylene glycol ester alginate. Examples of a purely synthetic-based pigment dispersing agent are a vinyl-based high polymer such as polyvinyl alcohol, polyvinyl pyrrolidone, and polyvinyl methyl ether; acrylic-based resin such as non-cross-linked polyacrylamide, polyacrylic acid or alkali metal salt thereof, and water-soluble styrene acrylic resin; and a natural high polymer compound such as water-soluble styrene maleate resin, water-soluble vinyl naphthalene acryl resin, water-soluble vinyl naphthalene maleate resin, polyvinyl pyrrolidone, polyvinyl alcohol, alkali metal salt of β-naphthalenesulfonic acid formalin condensate, a high polymer compound having salt of a cationic functional group such as quaternary ammonium or an amino group on the side chain, and ceramics. Among these, a particularly preferable high polymer dispersing agent is a hydrophilic high polymer compound in which a carboxyl group is induced, which carboxyl group comprises a copolymer of a monomer with a homopolymer such as acrylic acid, methacrylic acid, and styrene acrylate, and other hydrophilic groups.

The weight-average molecular weight of a copolymer is preferably 3,000 through 50,000, more preferably 5,000 through 30,000, and even more preferably 7,000 through 15,000.

The mixture mass ratio of the pigment and the dispersing agent (pigment:dispersing agent) is preferably 1:0.06 through 1:3, and more preferably 1:0.125 through 1:3.

The additive amount of the coloring agent in ink is preferably 6% by mass through 15% by mass, and more preferably 8% by mass through 12% by mass. If the additive amount is less than 6% by mass, the coloring power decreases, which decreases the image density, or the viscosity decreases, which promotes feathering or bleeding. If the additive amount exceeds 15% by mass, when the inkjet recording apparatus is neglected, dry ink may adhere to the nozzle so that the ink cannot be discharged, or the viscosity may become excessive so that the penetrability decreases and/or dots do not spread so that the image density is decreased or the image becomes vague.

-Wetting Agent-

The type of wetting agent is not particularly limited, and any type of wetting agent can be appropriately selected depending on the purpose. For example, at least one type is preferably selected from a polyol compound, a lactam compound, a urea compound, and saccharide.

Examples of a polyol compound are polyhydric alcohols, polyhydric alcohol alkylethers, polyhydric alcohol aryl ethers, a nitrogenated heterocyclic compound, amids, amines, sulfur-containing compounds, propylene carbonate, and ethylene acid. These polyol compounds may be used singularly or in combination.

Examples of polyhydric alcohols are ethylene glycol, diethylene glycol, triethylene glycol, polyethylene glycol, polypropylene glycol, 1,3-propanediol, 1,3-butanediol, 1,4-butanediol, 3-methyl-1,3-butanedioll, 3-propanediol, 1,5-pentanediol, 1,6-hexanediol, glycerol, 1,2,6-hexanetriol, 1,2,4-butanetriol, 1,2,3-butanetriol, and petriol.

Examples of polyhydric alcohol alkylethers are ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of polyhydric alcohol aryl ethers are ethylene glycol monophenol ether and ethylene glycol monobenzyl ether.

Examples of a nitrogenated heterocyclic compound are N-methyl-2-pyrrolidone, N-hydroxyethyl-2-pyrrolidone, 2-pyrrolidone, 1, 3-dimethyl imidazolidinone, and ε-caprolactam.

Examples of amides are formamide, N-methyl formamide, and N,N-dimethyl formamide.

Examples of amines are monoethanolamine, diethanolamine, triethanolamine, monoethylamine, diethylamine, and triethylamine.

Examples of sulfur-containing compounds are dimethyl sulfoxide, sulfolane, and thiodiethanol.

Among these, glycerin, ethylene glycol, diethylene glycol, triethylene glycol, polypropylene glycol, dipropylene glycol, tripropylene glycol, 1,3-butanediol, 2,3-butanediol, 1,4-butanediol, 3-methyl-1,3-butanedioll, 3-propanediol, 1,5-pentanediol, tetraethylene glycol, 1,6-hexanediol, 2-methyl-2,4-pentanediol, polyethylene glycol, 1,2,4-butanediol, 1,2,6-hexanetriol, thiodiglycol, 2-pyrrolidone, N-methyl-2-pyrrolidone, and N-hydroxyethyl-2-pyrrolidone are preferable in that superior effects can be achieved in preventing failures in ejection properties caused by solubility and moisture loss.

As a lactam compound, at least one type is selected from, e.g., 2-pyrrolidone, N-methyl-2-pyrrolidone, N-hydroxyethyl-2-pyrrolidone, and ε-caprolactam.

As a urea compound, at least one type is selected from, e.g., urea, thiourea, ethylene urea, and 1, 3-dimethyl-2-imidazolidinone. The preferable additive amount of urea in ink is generally 0.5% by mass through 50% by mass, and more preferably 1% by mass through 20% by mass.

Examples of saccharide are monosaccharide, disaccharide, oligosaccharide (including trisaccharide and tetrasaccharide), polysaccharide, or derivatives of these examples. Among these, preferable examples are glucose, mannose, fructose, ribose, xylose, arabinose, galactose, maltose, cellobiose, lactose, saccharose, trehalose, and malt triose, more preferably multitose, sorbitose, gluconolacton, and maltose.

Polysaccharide refers to a broad sense of sugar, and can refer to matters existing extensively in the natural world such as α-cyclodextrin and cellulose.

Derivatives of sugar include reduction sugar (e.g., sugar alcohol, represented by the general formula $HOCH_2(CHOH)_nCH_2OH$, where n is an integer number of 2 through 5), sugar oxide (e.g., aldonic acid and uronic acid), amino acid, and thioic acid. Among these, sugar alcohol is particularly preferable. Examples of alcohol are maltitol and sorbit.

The content of the wetting agent in ink is preferably 10% by mass through 50% by mass, and more preferably 20% by mass through 35% by mass. If the content is insufficient, dry ink may adhere to the nozzle so that liquid droplets cannot be discharged. If the content is excessive, the ink viscosity increases, and exceeds the appropriate range of viscosity.

-Penetrating Agent-

As the penetrating agent, a water-soluble organic solvent of a polyol compound or a glycol ether compound is used. At least one of a polyol compound and a glycol ether compound having a carbon number of eight or more is particularly preferable.

If the carbon number of the polyol compound is less than eight, a sufficient level of penetrability cannot be achieved. As a result, the recording medium may be soiled when performing duplex printing and/or ink does not spread sufficiently on the recording medium and pixels are not filled completely, thereby degrading the appearance of characters and decreasing the image density.

Preferable examples of a polyol compound having a carbon number of eight or more are 2-ethyl-1,3-hexanediol (solubility: 4.2% (25° C.)) and 2,2,4-trimethyl-1,3-pentanediol (solubility: 2.0% (25° C.)).

The type of glycol ether is not particularly limited, and any type of glycol ether can be appropriately selected depending on the purpose. Examples are polyhydric alcohol alkylethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyhydric alcohol aryl ethers such as ethylene glycol monophenol ether and ethylene glycol monobenzyl ether.

The additive amount of penetrating agent is not particularly limited and any amount can be appropriately selected depending on the purpose. However, the additive amount is preferably 0.1% by mass through 20% by mass, and more preferably 0.5% by mass through 10% by mass.

-Surface Active Agent-

The type of surface active agent is not particularly limited and any type can be appropriately selected depending on the purpose. Examples are an anionic surface active agent, a nonionic surface active agent, an ampholytic surface active agent, and a fluorochemical-based surface active agent.

Examples of an anionic surface active agent are polyoxyethylene alkylether acetate, dodecylbenzenesulfonic acid salt, lauryl acid salt, and polyoxyethylene alkylether sulphate salt.

Examples of a nonionic surface active agent are an acetylene glycol-based surface active agent, polyoxyethylene alkylether, polyoxyethylene alkylphenyl ether, polyoxyethylene alkylester, and polyoxyethylene sorbitan fatty acid ester.

Examples of an acetylene glycol-based surface active agent are 2,4,7,9-tetramethyl-5-decyne-4,7-diol, 3,6-dimethyl-4-octine-3,6-diol, and 3,5-dimethyl-1-hexene-3-ol. Examples of commercially available products of an acetylene glycol-based surface active agent are Surfynol 104, 82, 465, 485, TG manufactured by Air Products and Chemicals, Inc. (U.S.).

Examples of an ampholytic surface active agent are lauryl amino propionate, lauryl dimethyl betaine, stearyl dimethyl betaine, and lauryl dihydroxy ethyl betaine. Specific examples are lauryl dimethyl amineoxide, myristyl dimethyl amineoxide, stearyl dimethyl amineoxide, dihydroxyethyl lauryl amineoxide, polyoxyethylene coconut oil alkyldimethylamine oxide, dimethylalkyl (coconut) betaine, and dimethyl lauryl betaine.

Among these, surface active agents expressed by the following general formulae (I), (II), (III), (IV), (V), and (VI) are preferable.

   general formula (I)

In the general formula (I), R1 represents an alkyl group that can be branched, with a carbon number of 6 through 14. The letter h represents an integer number of 3 through 12. The letter M represents any component selected from alkali metal ion, quaternary ammonium, quaternary phosphonium, and alkanol amine.

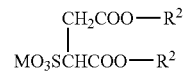   general formula (II)

In the general formula (II), $R^2$ represents an alkyl group that can be branched, with a carbon number of 5 through 16. The letter M represents any component selected from alkali metal ion, quaternary ammonium, quaternary phosphonium, and alkanol amine.

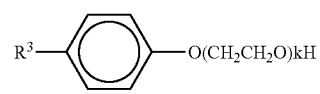   general formula (III)

In the general formula (III), $R^3$ represents a hydro carbon group, e.g., an alkyl group that can be branched, with a carbon number of 6 through 14. The letter k represents an integer number of 5 through 20.

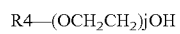   general formula (IV)

In the general formula (IV), R4 represents a hydro carbon group, e.g., an alkyl group that can be branched, with a carbon number of 6 through 14. The letter j represents an integer number of 5 through 20.

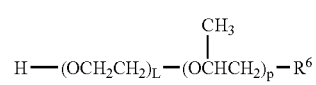   general formula (V)

In the general formula (V), $R^6$ represents a hydro carbon group, e.g., an alkyl group that can be branched, with a carbon number of 6 through 14. The letters L and p each represent an integer number of 1 through 20.

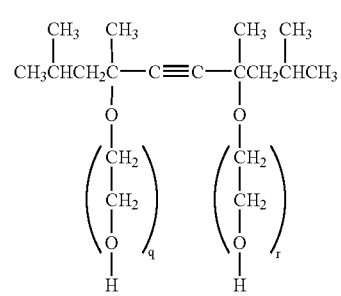   general formula (VI)

In the general formula (VI), q and r each represent an integer number of 0 through 40.

The surface active agents expressed by the aforementioned structural formulae (I) and (II) are indicated by specific free acid types. First, the surface active agent expressed by (I) can be expressed by the following formulae (I-1) through (I-6).

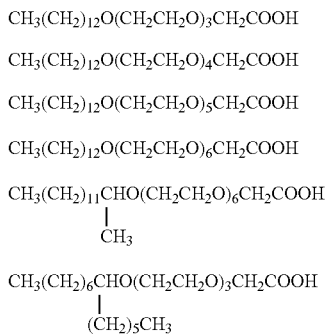

$$CH_3(CH_2)_{12}O(CH_2CH_2O)_3CH_2COOH \quad (I\text{-}1)$$

$$CH_3(CH_2)_{12}O(CH_2CH_2O)_4CH_2COOH \quad (I\text{-}2)$$

$$CH_3(CH_2)_{12}O(CH_2CH_2O)_5CH_2COOH \quad (I\text{-}3)$$

$$CH_3(CH_2)_{12}O(CH_2CH_2O)_6CH_2COOH \quad (I\text{-}4)$$

$$CH_3(CH_2)_{11}\underset{\underset{CH_3}{|}}{C}HO(CH_2CH_2O)_6CH_2COOH \quad (I\text{-}5)$$

$$CH_3(CH_2)_6\underset{\underset{(CH_2)_5CH_3}{|}}{C}HO(CH_2CH_2O)_3CH_2COOH \quad (I\text{-}6)$$

Next, the surface active agent expressed by (II) can be expressed by the following formulae (II-1) through (II-4).

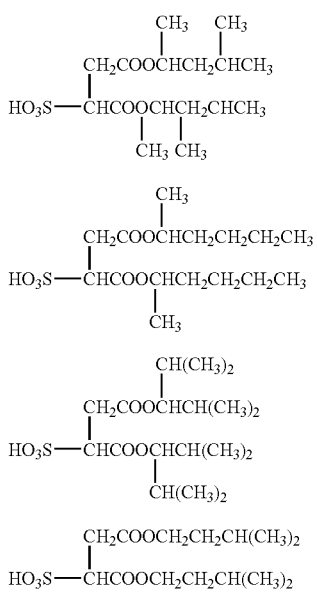

A preferable example of a fluorochemical-based surface active agent is expressed by the following general formula (A).

$$CF_3CF_2(CF_2CF_2)m\text{—}CH_2CH_2O(CH_2CH_2O)nH \quad (A)$$

In the general formula (A), m represents an integer number of 0 through 10 and n represents an integer number of 0-40.

Examples of a fluorochemical-based surface active agent are a perfluoro alkylsulfonate compound, a perfluoro alkylcarbon compound, a perfluoro alkylester phosphate compound, a perfluoro alkylethylene oxide adduct, and a polyoxyalkylene ether polymer compound having a perfluoro alkylether group on the side chain. Among these, a polyoxyalkylene ether polymer compound having a perfluoro alkylether group on the side chain is particularly preferable because it has minimal foaming properties, and is highly safe as it has minimal bioaccumulation potential of fluorine compounds, which is a controversial topic in recent years and continuing.

Examples of a perfluoro alkylsulfonate compound are perfluoro alkylsulfonate and perfluoro alkylsulfonate salt.

Examples of a perfluoro alkylcarbon compound are a perfluoro alkylcarboxylic acid and perfluoro alkylcarboxylic acid salt.

Examples of a perfluoro alkylester phosphate compound are perfluoro alkylester phosphate and perfluoro alkylester phosphate salt.

Examples of a polyoxyalkylene ether polymer compound having a perfluoro alkylether group on the side chain are polyoxyalkylene ether polymer having a perfluoro alkylether group on the side chain, alkyl sulfate of polyoxyalkylene ether polymer having a perfluoro alkylether group on the side chain, and salt of polyoxyalkylene ether polymer having a perfluoro alkylether group on the side chain.

Examples of counter ion of salt in the fluorochemical-based surface active agent are Li, Na, K, NH4, $NH_3CH_2CH_2OH$, $NH_2(CH_2CH_2OH)_2$, $NH(CH_2CH_2OH)_3$.

The fluorochemical surface active agent can be an appropriate combination of components or a commercially available product.

Examples of a commercial product are Surflon S-111, S-112, S-113, S-121, S-131, S-132, S-141, S-145 (manufactured by Asahi Glass Co., Ltd.), Fluorad FC-93, FC-95, FC-98, FC-129, FC-135, FC-170C, FC-430, FC-431 (manufactured by Sumitomo 3M Limited), MEGAFACE F-470, F1405, F-474 (manufactured by Dainippon Ink and Chemicals Incorporated), Zonyl TBS, FSP, FSA, FSN-100, FSN, FSO-100, FSO, FS-300, UR (manufactured by Du Pont Kabushiki Kaisha), FT-110, FT-250, FT-251, FT-400S, FT-150, FT-400SW (manufactured by Neos Company Limited), and PF-151N (manufactured by Omnova Solutions, Inc.). Among these, Zonyl FS-300, FSN, FSO-100, FSO (manufactured by Du Pont Kabushiki Kaisha) are particularly preferable in terms of enhancing reliability and color development.

-Other Components-

Other components are not particularly limited, and any component can be appropriately selected depending on the purpose. Examples are a resin emulsion, a pH controlling agent, an antiseptic mildewproofing agent, an anticorrosive agent, antioxidant, an ultraviolet ray absorbing agent, an oxygen absorbing agent, and a light stabilizer.

-Resin Emulsion-

A resin emulsion is formed by dispersing resin microparticles in water acting as a continuous phase, and a dispersing agent such as a surface active agent can be included according to need.

The preferable amount of resin microparticles acting as a disperse phase component included (i.e., the content of resin microparticles in the resin emulsion) is generally 10% by mass through 70% by mass. Furthermore, if the ink is to be used in an inkjet recording apparatus, the average particle diameter of resin microparticles is preferably 10 nm through 1,000 nm, more preferably 20 nm through 300 nm.

Components of the resin microparticles acting as the disperse phase are not particularly limited, and any component can be appropriately selected depending on the purpose. Examples are acrylic-based resin, vinyl acetate-based resin, styrene-based resin, butadiene-based resin, styrene-butadiene-based resin, vinyl chloride-based resin, acryl styrene-based resin, and acryl silicon-based resin. Among these, acryl silicon-based resin is particularly preferable.

The resin emulsion can be an appropriate combination of components or a commercially available product.

Examples of a commercially available resin emulsion are Microgel E-1002, E-5002 (styrene-acrylic-based resin emulsion, manufactured by Nippon Paint Co., Ltd.), Boncoat 4001 (acrylic-based resin emulsion, manufactured by Dainippon Ink and Chemicals Incorporated), Boncoat 5454 (styrene-acrylic-based resin emulsion, manufactured by Dainippon Ink and Chemicals Incorporated), SAE-1014 (styrene-acrylic-based resin emulsion, manufactured by Zeon Corporation), Saivinol SK-200 (acrylic resin emulsion, manufactured by Saiden Chemical Industry Co., Ltd.), Primal AC-22, AC-61 (acrylic-based resin emulsion, manufactured by Rohm and Haas Japan KK), NANOCRYL SBCX-2821, 3689 (acryl-based silicon resin emulsion, manufactured by Toyo Ink Manufacturing. Co., Ltd.), and #3070 (methyl methacrylate polymer resin emulsion, manufactured by Mikuni Color Ltd.).

The additive amount of resin microparticle components of resin emulsion in the ink is preferably 0.1% by mass through 50% by mass, more preferably 0.5% by mass through 20% by mass, and even more preferably 1% by mass through 10% by mass. If the additive amount is less than 0.1% by mass, the ability of preventing ink from clogging the nozzles and the stability of ink discharging properties become insufficient. If the additive amount exceeds 50% by mass, the stability in ink preservation properties is degraded.

Examples of an antiseptic mildewproofing agent are 1,2-benzoisothiazolin-3-one, sodium dehydroacetate, sodium sorbate, 2-pyridinethiol-1-oxide sodium, sodium benzoate, and sodium pentachlorophenol.

The type of pH controlling agent is not particularly limited as long as the pH can be controlled to seven or more without having an adverse effect on the ink, and any type of pH controlling agent can be appropriately selected depending on the purpose.

Examples of a pH controlling agent are amines such as diethanolamine and triethanolamine; hydroxides of alkali metals such as lithium hydroxide, sodium hydroxide, and potassium hydroxide; and carbonates of alkali metals such as ammonium hydroxide, quaternary ammonium hydroxide, quaternary phosphonium hydroxide, lithium carbonate, sodium carbonate, and potassium carbonate.

Examples of an anticorrosive agent are acid sulfite salt, sodium thiosulfate, ammonium thiodiglycolate, diisopropyl ammonium nitrate, pentaerythritol tetrahydrochloride, and dicyclohexyl ammonium nitrate.

Examples of an antioxidant are a phenol-based antioxidant (including a hindered phenol-based antioxidant), an amine-based antioxidant, a sulfur-based antioxidant, and a phosphorus-based antioxidant.

Examples of a phenol-based antioxidant (including a hindered phenol-based antioxidant) are butylated hydroxyanisole, 2,6-di-tert-butyl-4-ethylphenol, stearyl-β-(3,5-di-tert-butyl-4-hydroxyphenyl) propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl) propionate]methane.

Examples of an amine-based antioxidant are phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-creosol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidene bis(3-methyl-6-tert-butylphenol), 4,4'-hiobis(3-methyl-6-tert-butylphenol), tetrakis[methylene-3(3,5-di-tert-butyl-4-ihydroxyphenyl)propionate]methane, and 1,1,3-tris(2-ethyl-4-hydroxy-5-tert-butylphenyl)butane.

Examples of a sulfur-based antioxidant are dilauryl 3,3'-thiodipropionate, distearyl thiodipropionate, laurylstearyl thiodipropionate, dimyristyl 3,3'-thiodipropionate, distearyl β,β'-thiodipropionate, 2-mercaptobenzoimidazole, and dilaurylsulfide.

Examples of a phosphorus-based antioxidant are triphenylphosphite, octadecylphosphite, triisodecylphosphite, trilauryl trithiophosphite, and trinonylphenylphosphite.

Examples of an ultraviolet ray absorbing agent are a benzophenone-based ultraviolet ray absorbing agent, a benzotriazole-based ultraviolet ray absorbing agent, a salicylate-based ultraviolet ray absorbing agent, a cyanoacrylate-based ultraviolet ray absorbing agent, and a nickel complex salt-based ultraviolet ray absorbing agent.

Examples of a benzophenone-based ultraviolet ray absorbing agent are 2-hydroxy-4-n-octoxybenzophenone, 2-hydroxy-4-n-dodecyloctoxybenzophenone, 2,4-dihydroxybenzophenone, 2-hydroxy-4-methoxybenzophenone, and 2,2',4,4'-tetrahydroxybenzophenone.

Examples of a benzotriazole-based ultraviolet ray absorbing agent are 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of a salicylate-based ultraviolet ray absorbing agent are phenylsalicylate, p-tert-butylphenylsalicylate, and p-octylphenylsalicylate.

Examples of a cyanoacrylate-based ultraviolet ray absorbing agent are ethyl-2-cyano-3,3'-diphenylacrylate, methyl-2-cyano-3-methyl-3-(p-methoxyphenyl)acrylate, and butyl-2-cyano-3-methyl-3-(p-methoxyphenyl)acrylate.

Examples of a nickel complex salt-based ultraviolet ray absorbing agent are nickel bis(octylphenyl)sulfide, 2,2'-thiobis(4-tert-octylferrate)-n-butylamine nickel(II), 2,2'-thiobis(4-tert-octylferrate)-2-ethylhexylamine nickel(II), and 2,2'-thiobis(4-tert-octylferrate)triethanolamine nickel(II).

The ink of an ink media set according to an embodiment of the present invention is manufactured by dispersing or dissolving components in an aqueous medium, and stirring and mixing the components according to need. The components include at least water, a coloring agent, and a wetting agent, and according need, a penetrating agent and a surface active agent, and even more other components according to need. The dispersion is performed with a sand mill, a homogenizer, a ball mill, a paint shaker, or an ultrasonic disperser. The stirring and mixing is performed with a regular stirrer with stirring wings, a magnetic stirrer, or a high-speed disperser.

The viscosity of ink is preferably 1 cps or more and 30 cps or less under a temperature of 25° C., and more preferably 2 cps through 20 cps. If the viscosity exceeds 20 cps, it may be difficult to maintain discharging stability.

The pH of ink is preferably 7 through 10.

The coloring of ink is not particularly limited, and any color can be appropriately selected depending on the purpose. Examples are yellow, magenta, cyan, and black. By recording an image with an ink set using two or more of these colors in combination, a multicolor image can be formed. By recording an image with an ink set using all of these colors in combination, a full color image can be formed.

Next, specific embodiments are described. The present invention is not limited to these embodiments.

ADJUSTMENT EXAMPLE 1

-Adjustment of Polymer Microparticle Dispersing Element Including Copper Phthalocyanine Pigment- Oxygen in a 1 liter flask provided with a mechanical stirrer, a thermometer, a nitrogen gas introduction tube, a circulating tube, and a dropping funnel was thoroughly replaced with nitrogen gas. Then, styrene 11.2 g, acrylic acid 2.8 g, lauryl methacrylate 12.0 g, polyethylene glycol methacrylate 4.0 g, styrene macromer (manufactured by TOAGOSEI CO., LTD., product name: AS-6) 4.0 g, and mercaptoethanol 0.4 g were provided in the flask, and heated to 65° C. Next, a mixed solution of styrene 100.8 g, acrylic acid 25.2 g, lauryl methacrylate 108.0 g, polyethylene glycol methacrylate 36.0 g, hydroxyethyl methacrylate 60.0 g, styrene macromer (manufactured by TOAGOSEI CO., LTD., product name: AS-6) 36.0 g, mercaptoethanol 3.6 g, azobis dimethyl valero nitrile 2.4 g, and methyl ethyl ketone 18 g was dropped into the flask over a period of 2.5 hours.

When the dropping operation was completed, a mixed solution of azobis dimethyl valeronitrile 0.8 g and methyl ethyl ketone 18 g was dropped into the flask over a period of 0.5 hours. After maturing for one hour at 65° C., azobis dimethyl valeronitrile 0.8 g was added, and was then matured for another hour. When reaction was completed, methyl ethyl ketone 364 g was added to the flask, thereby achieving 800 g of a polymer solution with a density of 50% by mass. Next, part of the polymer solution was dried. The weight average molecular weight (Mw) was 15,000, measured with a gel permeation chromatography (standard: polystyrene, solvent: tetrahydrofuran).

Next, the achieved polymer solution 28 g, a copper phthalocyanine pigment 26 g, 1 mol/L potassium hydroxide solution 13.6 g, methyl ethyl ketone 20 g, and ion-exchanged water 30 g were sufficiently stirred together. Subsequently, a three roll mill (manufactured by Noritake Company Limited, product name: NR-84A) was used to knead the solution 20 times to form a paste. The paste was put in ion-exchanged water 200 g, and stirred sufficiently. Subsequently, an evaporator was used to remove the methyl ethyl ketone and water, thus achieving 160 g of a blue polymer microparticle dispersing element having a solid quantity of 20.0% by mass.

The achieved polymer microparticles had an average particle diameter (D 50%) of 93 nm, measured with a particle size distribution measuring device (Microtrac UPA, manufactured by NIKKISO CO., LTD.).

ADJUSTMENT EXAMPLE 2

-Adjustment of Polymer Microparticle Dispersing Element Including Dimethyl Guinacridone Pigment- The copper phthalocyanine pigment of adjustment example 1 was replaced with C.I. pigment red 122. Otherwise, a magenta polymer microparticle dispersing element was adjusted in the same manner as adjustment example 1.

The achieved polymer microparticles had an average particle diameter (D 50%) of 127 nm, measured with a particle size distribution measuring device (Microtrac UPA, manufactured by NIKKISO CO., LTD.).

ADJUSTMENT EXAMPLE 3

-Adjustment of Polymer Microparticle Dispersing Element Including Monoazo Yellow Pigment- The copper phthalocyanine pigment of adjustment example 1 was replaced with C.I. pigment yellow 74. Otherwise, a yellow polymer microparticle dispersing element was adjusted in the same manner as adjustment example 1.

The achieved polymer microparticles had an average particle diameter (D 50%) of 76 nm, measured with a particle size distribution measuring device (Microtrac UPA, manufactured by NIKKISO CO., LTD.).

ADJUSTMENT EXAMPLE 4

-Adjustment of a Carbon Black Dispersing Element Treated With a Sulfonating Agent- A commercially available carbon black pigment ("PRINTEX #85", manufactured by Degussa Japan Co., Ltd.) 150 g was mixed well in sulfolane 400 ml and finely dispersed with a bead mill. Then, sulfamic acid 15 g was added and stirred for 10 hours in 140° C.-150° C., and slurry was achieved. The slurry was put in 1,000 ml of ion-exchanged water, and stirred at 12,000 rpm with a centrifuge, thereby achieving a surface-treated carbon black wet cake. The carbon black wet cake is dispersed once again in 2,000 ml of ion-exchanged water, pH-controlled with lithium hydroxide, and desalted and condensed with an ultrafilter memberane, thereby achieving a carbon black dispersing element having a pigment density of 10% by mass. Furthermore, the element was filtered with a nylon filter having an average pore size of 1 μm, thereby achieving the final carbon black dispersing element.

The achieved carbon black dispersing element had an average particle diameter (D 50%) of 80 nm, measured with a particle size distribution measuring device (Microtrac UPA, manufactured by NIKKISO CO., LTD.).

MANUFACTURING EXAMPLE 1 OF INK

-Fabrication of Cyan Ink-

A polymer microparticle dispersing element including a copper phthalocyanine pigment of adjustment example 1 20.0% by mass, 3-methyl-1,3-butanediol 23.0% by mass, glycerin 8.0% by mass, 2-ethyl-1,3-hexanediol 2.0% by mass, FS-300 as a fluorine-based surface active agent (manufactured by Du Pont Kabushiki Kaisha) 2.5% by mass, Proxel LV as a antiseptic fungicide agent (manufactured by Avecia Limited) 0.2% by mass, 2-amino-2-ethyl-1,3-propanediol 0.5% by mass, and an appropriate amount ion-exchanged water were added together to achieve 100% by mass. Subsequently, this mixed solution was filtered with a membrane filter of having an average pore size of 0.8 μm. Cyan ink was adjusted in this manner.

MANUFACTURING EXAMPLE 2 OF INK

-Fabrication of Magenta Ink-

A polymer microparticle dispersing element including dimethyl quinacridone pigment of adjustment example 2 20.0% by mass, 3-methyl-1,3-butanediol 22.5% by mass, glycerin 9.0% by mass, 2-ethyl-1,3-hexanediol 2.0% by mass, FS-300 as a fluorine-based surface active agent (manufactured by Du Pont Kabushiki Kaisha) 2.5% by mass, Proxel LV as a antiseptic fungicide agent (manufactured by Avecia Limited) 0.2% by mass, 2-amino-2-ethyl-1,3-propanediol 0.5% by mass, and an appropriate amount ion-exchanged water were added together to achieve 100% by mass. Subsequently, this mixed solution was filtered with a membrane filter of having an average pore size of 0.8 μm. Magenta ink was adjusted in this manner.

MANUFACTURING EXAMPLE 3 OF INK

-Fabrication of Yellow Ink-

A polymer microparticle dispersing element including monoazo yellow pigment of adjustment example 3 20.0% by mass, 3-methyl-1,3-butanediol 24.5% by mass, glycerin 8.0% by mass, 2-ethyl-1,3-hexanediol 2.0% by mass, FS-300 as a fluorine-based surface active agent (manufactured by Du Pont Kabushiki Kaisha) 2.5% by mass, Proxel LV as a antiseptic fungicide agent (manufactured by Avecia Limited) 0.2% by mass, 2-amino-2-ethyl-1,3-propanediol 0.5% by mass, and an appropriate amount ion-exchanged water were added together to achieve 100% by mass. Subsequently, this mixed solution was filtered with a membrane filter of having an average pore size of 0.8 μm. Yellow ink was adjusted in this manner.

MANUFACTURING EXAMPLE 4 OF INK

-Fabrication of Black Ink-

A carbon black dispersing element of adjustment example 4 20.0% by mass, 3-methyl-1,3-butanediol 22.5% by mass., glycerin 7.5% by mass, 2-pyrrolidone 2.0% by mass, 2-ethyl-1,3-hexanediol 2.0% by mass, FS-300 as a fluorine-based surface active agent (manufactured by Du Pont Kabushiki Kaisha) 2.5% by mass, Proxel LV as an antiseptic fungicide agent (manufactured by Avecia Limited) 0.2% by mass, 2-amino-2-ethyl-1,3-propanedio 10.5% by mass, and an appropriate amount ion-exchanged water were added together to achieve 100% by mass. Subsequently, this mixed solution was filtered with a membrane filter of having an average pore size of 0.8 μm. Black ink was adjusted in this manner.

The surface tension and the viscosity of each type of ink manufactured by the manufacturing examples 1 through 4 were measured. Results are shown in Table 1 below.

<Measurement of Viscosity>

The viscosity was measured by using an R-500 type viscosity meter (manufactured by Toki Sangyo Co., Ltd.) under the conditions of 1° 34'×R24 cone, 60 rpm, three minutes later, and at 25° C.

<Measurement of Surface Tension>

The surface tension was measured by using a surface tension measuring device (CBVP-Z, manufactured by Kyowa Interface Science Co., Ltd.). Specifically, the static surface tension was measured using a platinum plate at 25° C.

TABLE 1

|  | Viscosity (mPa · s) | Surface tension (mN/m) |
|---|---|---|
| Manufacturing example 1 | 8.05 | 25.4 |
| Manufacturing example 2 | 8.09 | 25.4 |
| Manufacturing example 3 | 8.11 | 25.7 |
| Manufacturing example 4 | 8.24 | 25.4 |

-Fabrication of Base-

A slurry of 0.3% by mass with the following composition was made with a fourdrinier machine, and a base with a basis weight of 79 g/m² was fabricated. In a size press procedure of a paper making procedure, an oxidized starch aqueous solution was applied in such a manner that the solid adhering amount on each side of the base became 1.0 g/m².

Broad leaf tree bleached kraft pulp (LBKP) . . . 80 pts. mass
Needle leaf tree bleached kraft pulp (NBKP) . . . 20 pts. mass
Precipitated calcium carbonate (product name: TP-121, manufactured by Okutama Kogyo Co., Ltd.) . . . 10 pts. mass
Aluminium sulfate . . . 1.0 pts. mass
Ampholytic starch (product name: Cato3210, manufactured by Nippon NSC Ltd.) . . . 1.0 pts. mass
Neutral rosin size agent (product name: NeuSize M-10, manufactured by Harima Chemicals, Inc.) . . . 0.3 pts. mass
Retention aid (product name: NR-11LS, manufactured by HYMO Co., Ltd.) . . . 0.02 pts. mass

MANUFACTURING EXAMPLE 1 OF RECORDING MEDIUM

-Fabrication of Recording Medium 1-

Coating liquid with a solid content density of 60% by mass was adjusted by adding together 70 pts. mass of clay as a pigment in which the ratio of particles with sizes of 2 μm or less is 97% by mass, 30 pts. mass of calcium carbonate heavy whose average particle diameter is 1.1 μm, 8 pts. mass of styrene-butadiene copolymer emulsion as an adhesive whose glass-transition temperature (Tg) is −5° C., 1 pt. mass of phosphorylated starch, 0.5 pt. mass of calcium stearate as an assistant, and water.

The achieved coating liquid was coated onto both sides of the fabricated base using a blade coater in such a manner that the solid adhering amount on each side became 8.0 g/m². After hot-air drying the coating, the coating was treated with a multistage-supercalender, thereby fabricating the "recording medium 1".

MANUFACTURING EXAMPLE 2 OF RECORDING MEDIUM

-Fabrication of Recording Medium 2-

Coating liquid with a solid content density of 60% by mass was adjusted by adding together 70 pts. mass of clay as a pigment in which the ratio of particles with sizes of 2 μm or less is 97% by mass, 30 pts. mass of calcium carbonate heavy whose average particle diameter is 1.1 μm, 7 pts. mass of styrene-butadiene copolymer emulsion as an adhesive whose glass-transition temperature (Tg) is −5° C., 0.7 pt. mass of phosphorylated starch, 0.5 pt. mass of calcium stearate as an assistant, and water.

The achieved coating liquid was coated onto both sides of the fabricated base using a blade coater in such a manner that the solid adhering amount on each side became 8.0 g/m². After hot-air drying the coating, the coating was treated with a multistage-supercalender, thereby fabricating the "recording medium 2".

PRACTICAL EXAMPLE 1

-Inkset, Recording Medium, and Image Recording-

An "inkset 1" including the black ink of manufacturing example 4, the yellow ink of manufacturing example 3, the magenta ink of the manufacturing example 2, and the cyan ink of the manufacturing example 1 was adjusted by a conventional method.

By employing the adjusted inkset 1 and the recording medium 1, printing was performed with a test model of a drop-on-demand printer with nozzles having a capacity of 300 dpi and nozzle resolution of 384. Specifically, printing was performed at an image resolution of 600 dpi and maximum ink droplets of 18 pl. The adhering volume was controlled in such a manner that the total volume control of secondary colors corresponds to 140%. Under such conditions, an image printout with solid images and characters was obtained.

PRACTICAL EXAMPLE 2

-Inkset, Recording Medium, and Image Recording-

In a practical example 2, the recording medium 2 was employed instead of the recording medium 1 employed in the practical example 1. Otherwise, printing was performed in the same manner as the practical example 1 to obtain an image printout.

PRACTICAL EXAMPLE 3

-Inkset, Recording Medium, and Image Recording-

In a practical example 3, gravure printing coated paper (product name: space DX, basis weight=56 g/m², manufactured by Nippon Paper Industries Co., Ltd.) (hereinafter, "recording medium 3") was employed instead of the recording medium 1 employed in the practical example 1. Otherwise, printing was performed in the same manner as the practical example 1 to obtain an image printout.

COMPARATIVE EXAMPLE 1

-Inkset, Recording Medium, and Image Recording-

In comparative example 1, commercially available offset printing coated paper (product name: aurora coat, basis weight=104.7 g/m², manufactured by Nippon Paper Industries Co., Ltd., hereinafter, "recording medium 4") was employed instead of the recording medium 1 employed in the practical example 1. Otherwise, printing was performed in the same manner as the practical example 1 to obtain an image printout.

COMPARATIVE EXAMPLE 2

-Inkset, Recording Medium, and Image Recording-

In comparative example 1, commercially available inkjet mat coated paper (product name: super fine special paper, manufactured by Seiko Epson Corporation, hereinafter, "recording medium 5") was employed instead of the recording medium 1 employed in the practical example 1. Otherwise, printing was performed in the same manner as the practical example 1 to obtain an image printout.

Next, for each of the recording medium 1, the recording medium 2, the recording medium 3, the recording medium 4, and the recording medium 5, the transfer amounts of pure water and cyan ink of the manufacturing example 1 were measured with a dynamic scanning liquid absorption meter. The results are shown in Table 2.

<Measurement of Transfer Amount of Pure Water and Cyan Ink Using a Dynamic Scanning Liquid Absorption Meter>

For each type of recording medium, a dynamic scanning liquid absorption meter (K350 series D type manufactured by Kyowa Seiko Co., Ltd.) was used to measure the transfer amount of pure water and cyan ink under the conditions of 25° C. and 50% RH. The transfer amounts after a contact time of 100 ms and a contact time of 400 ms were obtained by interpolating measurement values of the transfer amounts in contact time lengths close to the respective contact times.

TABLE 2

| | | Pure water | | Ink of manufacturing example 1 ($\gamma = 25$) | |
|---|---|---|---|---|---|
| | | Contact time of 100 ms | Contact time of 400 ms | Contact time of 100 ms | Contact time of 400 ms |
| Practical example 1 | Recording medium 1 | 10.1 ml/m² | 20.2 ml/m² | 7.2 ml/m² | 14.8 ml/m² |
| Practical example 2 | Recording medium 2 | 25.2 ml/m² | 28.5 ml/m² | 14.6 ml/m² | 19.4 ml/m² |
| Practical example 3 | Recording medium 3 | 10.4 ml/m² | 21.8 ml/m² | 6.4 ml/m² | 8.8 ml/m² |
| Comparative example 1 | Recording medium 4 | 2.8 ml/m² | 3.4 ml/m² | 2.7 ml/m² | 3.1 ml/m² |
| Comparative example 2 | Recording medium 5 | 41.0 ml/m² | 44.8 ml/m² | 38.1 ml/m² | 46.2 ml/m² |

Next, for each of the obtained image printouts of the practical examples 1-3, the beading phenomenon, the bleeding phenomenon, spur traces, and glossiness were evaluated. Results are shown in Table 3.

<Evaluation of Beading>

Beading was evaluated by visually observing the extent of a beading phenomenon in a green solid image part in each image printout, based on the following criteria.

[Evaluation Criteria]

Rank 4: No beading phenomenon is observed, and the image is printed uniformly.
Rank 3: A slight beading phenomenon is observed.
Rank 2: An apparent beading phenomenon is observed.
Rank 1: A considerable beading phenomenon is observed.

<Evaluation of Bleeding>

Bleeding was evaluated by visually observing the extent of a bleeding phenomenon in black characters in a yellow background in each image printout, based on the following criteria.

[Evaluation Criteria]

● No bleeding phenomenon is observed, and the characters are clearly printed.
○ A slight bleeding phenomenon is observed.
x A considerable bleeding phenomenon in such a manner that the outlines of the characters are unclear.

<Evaluation of Spur Traces>

The extent of spur traces in each image printout was visually observed, and evaluations were made based on the following criteria.

[Evaluation Criteria]

● No spur traces are observed.
○ Slight spur traces are observed.
x Clear spur traces are observed.

<Evaluation of Glossiness>

The 60° specular glossiness (JIS Z8741) of a cyan solid image part was measured in each image printout.

TABLE 3

| | Beading | Bleeding | Spur traces | Glossiness of image part |
|---|---|---|---|---|
| Practical example 1 | 3 | ○ | ○ | 29.4 |

TABLE 3-continued

|  | Beading | Bleeding | Spur traces | Glossiness of image part |
|---|---|---|---|---|
| Practical example 2 | 4 | ● | ● | 27.8 |
| Practical example 3 | 3 | ○ | ○ | 22.3 |
| Comparative example 1 | 1 | Δ (between ○ and x) | x | 32.1 |
| Comparative example 2 | 4 | ● | ● | 1.7 |

The results shown in Table 3 say that overall, the practical examples 1-3 were given substantially higher evaluations (in mitigating beading, bleeding, and spur traces, and realizing high levels of glossiness) compared to the comparative examples 1 and 2. The practical examples 1-3 employed a combination of ink that includes at least water, a coloring agent, and a wetting agent, and has surface tension of 20 mN/m through 35 mN/m at 25° C. and recording medium that had the following properties, i.e., the transfer amount of ink into the recording medium measured with a dynamic scanning liquid absorption meter is 4 ml/m²-15 ml/m² during a contact time of 100 ms and 7 ml/m²-20 ml/m² during a contact time of 400 ms.

As described above, by adding a fluorochemical surface active agent in addition to a water-soluble solvent (1,3-butanediol, ethyl hexanediol), it is possible to increase the permeability in practical terms, even in commercial/publication-use coated paper that has lower permeability than inkjet-dedicated paper and plain paper.

However, even such pigment-based ink cannot always be quickly fixed onto commercial/publication-use coated paper, and therefore, a beading phenomenon is more likely to occur due to the lower permeability of the commercial/publication-use coated paper compared to inkjet-dedicated paper and plain paper.

In order to further mitigate the beading phenomenon, an embodiment of the present invention provides a structure in which ink droplets are not injected at adjacent recording positions while the ink permeating process is under progress. In this manner, the beading phenomenon can be mitigated without decreasing the recording speed. By mitigating the beading phenomenon, it is not only possible to form images of higher quality compared to those recorded at high speed according to the conventional technology, but also to use paper types that have been considered to be inapplicable for line-type inkjet recording apparatuses.

Commercial/publication-use coated paper is not outperformed by inkjet-dedicated glossy paper in terms of visible texture, and is very inexpensive. Because it is inexpensive, commercial/publication-use coated paper is appropriate for mass-consumption, i.e., high-speed printing. However, the problem is that it has poor absorbency of water-based ink, and has thus been considered to be inapplicable for conventional inkjet recording apparatuses that use water-based ink.

In an embodiment of the present invention, a beading phenomenon can be mitigated, and therefore, high-speed recording can be practically performed even with paper with poor absorbency. If high-speed recording can be performed with commercial/publication-use coated paper, it is possible to obtain the same level of image quality as inkjet-dedicated paper and also reduce costs considerably. Furthermore, by using commercial/publication-use coated paper in combination with highly-permeable ink, high-quality images with less bleeding and irregularities can be recorded.

Details are described below.

Figure 6:
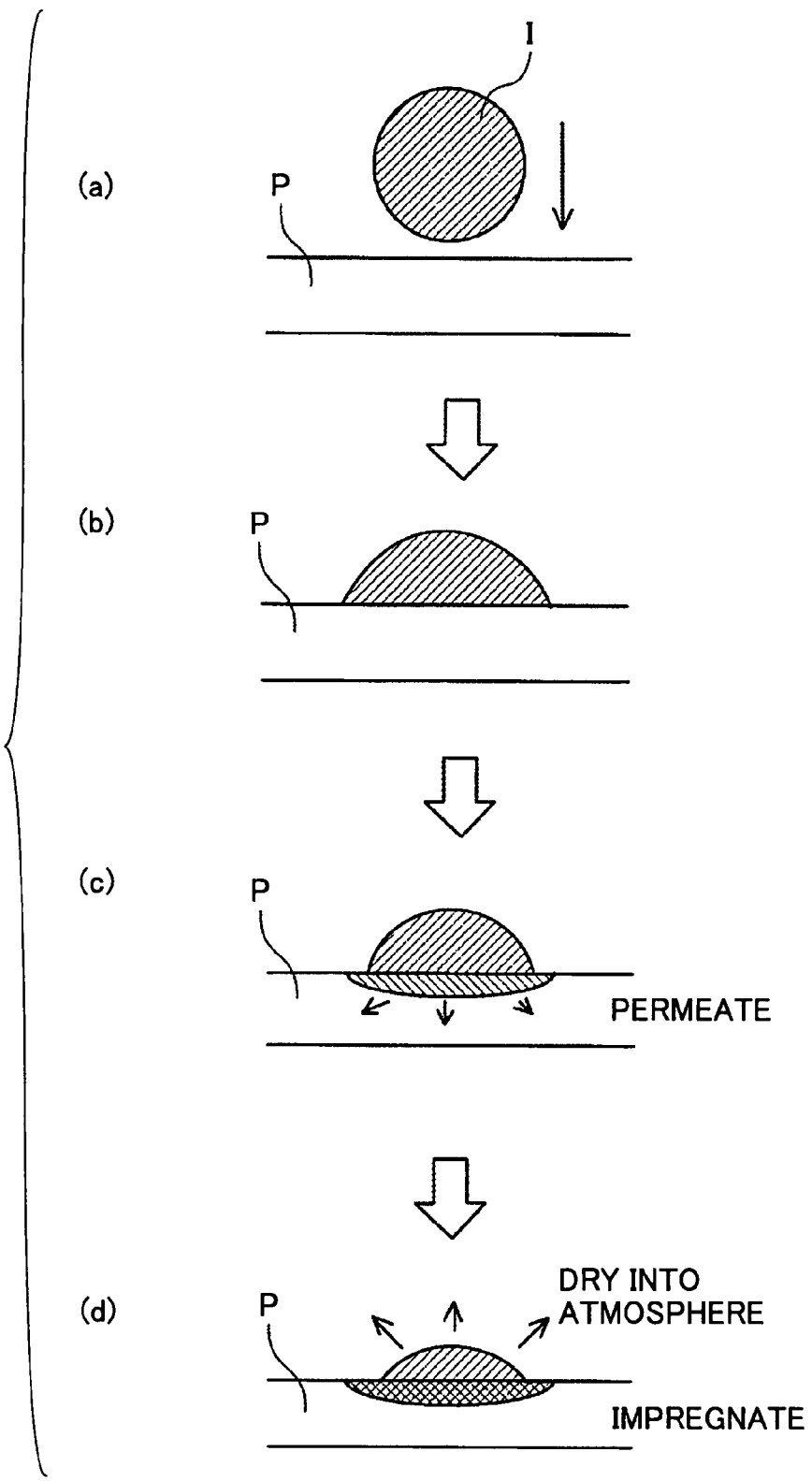
FIG. 6 illustrates a fixing process of ink on a sheet.

The ink fixing process is described with reference to FIG. 6. As shown in FIG. 6(a), an ink droplet I is ejected onto the surface of a sheet of paper P. As shown in FIG. 6(b), the ink droplet I lands on the sheet P. As shown in FIG. 6(c), the ink droplet I starts permeating into the sheet P (permeating process) immediately after landing on the sheet P. As shown in FIG. 6(d), after a while, part of the ink droplet starts drying (evaporating) into the atmosphere (drying process).

Figure 7:
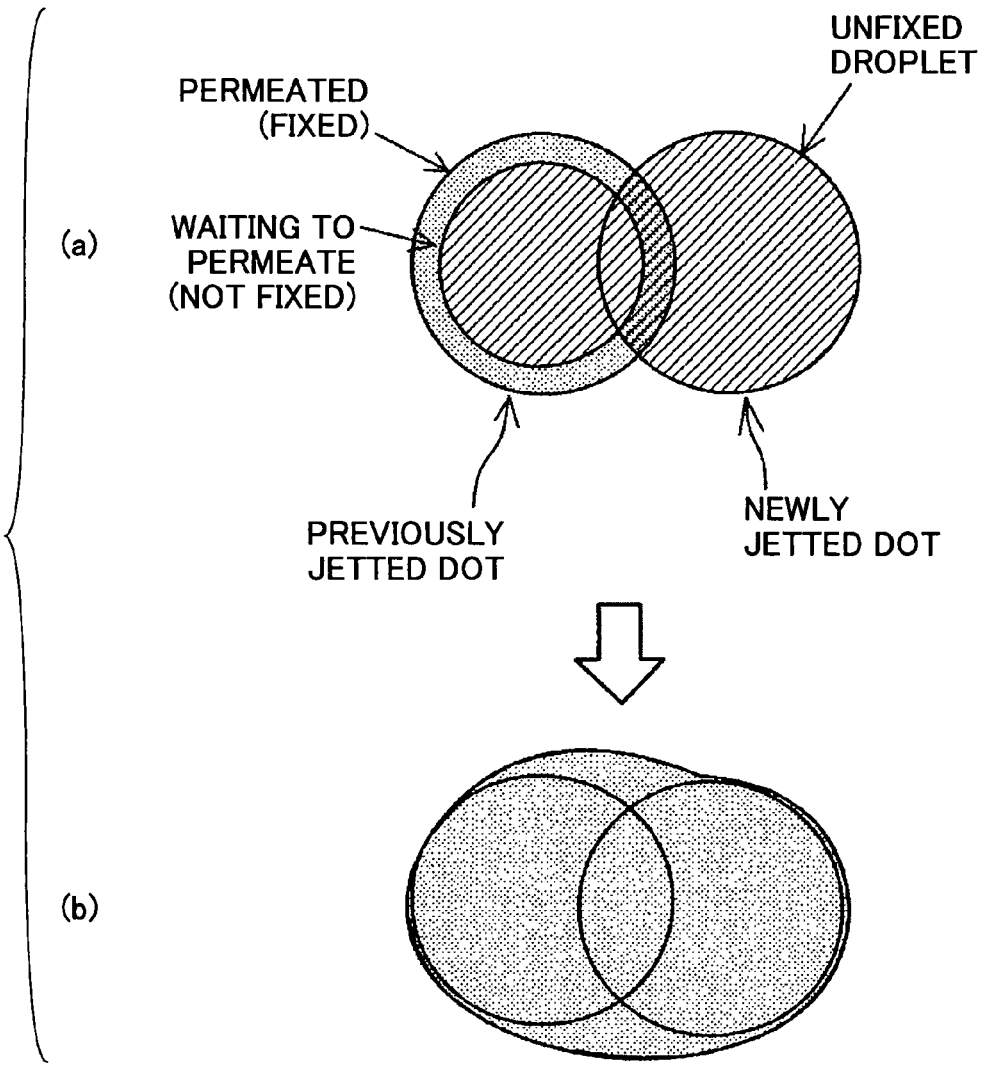
FIG. 7 illustrates a process of a beading phenomenon.

The outer rim of a dot that is formed as the ink droplet adheres on the sheet is fixed substantially according this permeating process. Accordingly, if there are no influences from outside until the permeating process recedes, a beading phenomenon will not occur. In conventional high-speed recording, as shown in FIG. 7(a), a succeeding droplet is ejected onto an adjacent dot position before the permeating process recedes. For this reason, the additional ink flows into the area where wet ink (not dried) still remains on the sheet waiting to permeate into the sheet. As a result, as shown in FIG. 7(b), a beading phenomenon occurs (the ink breaks through the outer rim of dots).

The ink permeating process corresponds to the transfer of moisture described in the section about commercial/publication-use coated paper. The time required for the permeating process corresponds to the liquid transfer amount impregnating time. By delaying the timing of ejecting an ink droplet onto an adjacent position by the liquid transfer amount impregnating time, the outer rim of a dot fixed on the sheet can grow larger. Accordingly, it is possible to mitigate the beading phenomenon that is triggered when dots overlap each other.

With the following three structures, it is possible to eject ink droplets at different timings.

(1) Space apart nozzles used for dots striking at adjacent positions.

(2) Arrange nozzles used for dots striking at adjacent positions on different head units, and space apart the head units.

(3) Reduce the recording speed, and ensure that there is sufficient time to eject ink droplets in the sheet conveying direction (recording direction).

Figure 8:
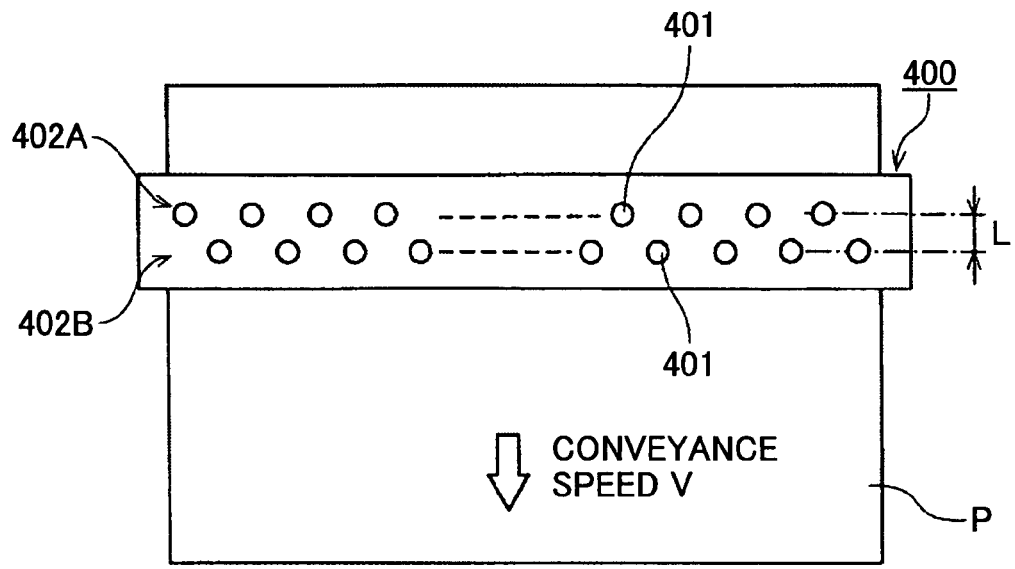
FIG. 8 illustrates one example of a liquid discharging head according to a first embodiment of the present invention.
Figure 9:
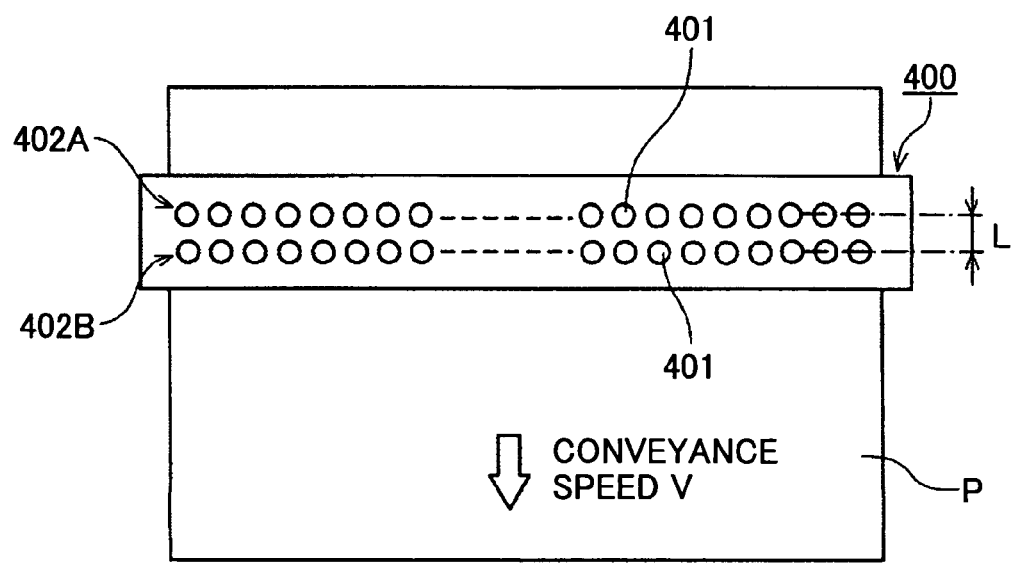
FIG. 9 illustrates another example of the liquid discharging head according to the first embodiment of the present invention.

A first embodiment of the present invention is described with reference to FIGS. 8 and 9. FIGS. 8 and 9 illustrate liquid discharging heads according to the same embodiment with different nozzle arrangements.

The first embodiment is relevant to the above structure (1). A line-type liquid discharging head 400 has plural nozzle rows 402A, 402B, with each row including plural nozzles 401 used for discharging liquid droplets.

In the example shown in FIG. 8, the nozzles 401 in the nozzle row 402A (e.g., odd numbered nozzles) and the nozzles 401 in the nozzle row 402B (e.g., even numbered nozzles) are arranged in a staggered fashion. By using the nozzles 401 in both nozzle rows 402A, 402B, a desired resolution level can be achieved in the sheet width direction.

In the example shown in FIG. 9, the nozzles 401 of the nozzle row 402A and the nozzles 401 of the nozzle row 402B are arranged at overlapping positions (i.e., aligned with each other) in the sheet conveying direction. By using the nozzles 401 in either one of the nozzle rows 402A, 402B, a desired resolution level can be achieved in the sheet width direction.

The nozzle rows 402A, 402B are arranged with an interval L (distance between nozzle rows) therebetween in the sheet conveying direction. Therefore, the following time difference T is caused to occur between the timing at which the nozzles

401 of the nozzle row 402A discharge liquid droplets and the timing at which the nozzles 401 of the nozzle row 402B discharge liquid droplets.

$$T=L/V$$

T: Time difference between landing timings of liquid droplets

L: Distance between nozzle rows

V: Sheet conveying speed

A beading phenomenon can be mitigated by specifying the distance between nozzle rows in such a manner that the time difference T becomes equal to the transfer amount impregnating time.

Specifically, a distance L1 between the nozzle rows 402A and 402B of the liquid discharging head 400 is obtained by the following formula.

$$L1=T1 \times V1$$

V1: Sheet conveying speed

T1: Ink transfer amount impregnating time (time required for ink to impregnate a standard sheet)

In the head configuration (nozzle row arrangement) shown in FIG. 8, the nozzle rows 402A, 402B of the liquid discharging head 400 are arranged in such a manner that nozzles adjacent to each other belong to different nozzle rows. Therefore, all of the nozzles 401 of the nozzle rows 402A, 402B are used for liquid droplets of the same color. Meanwhile, in the head configuration (nozzle row arrangement) shown in FIG. 9, the nozzles 401 of the nozzles row 402A and the nozzles 401 of the nozzles row 402B of the liquid discharging head 400 are arranged at overlapping positions (aligned with each other). Therefore, alternate nozzles in each of the nozzle rows 402A, 402B are used for liquid droplets of the same color.

Figure 10:
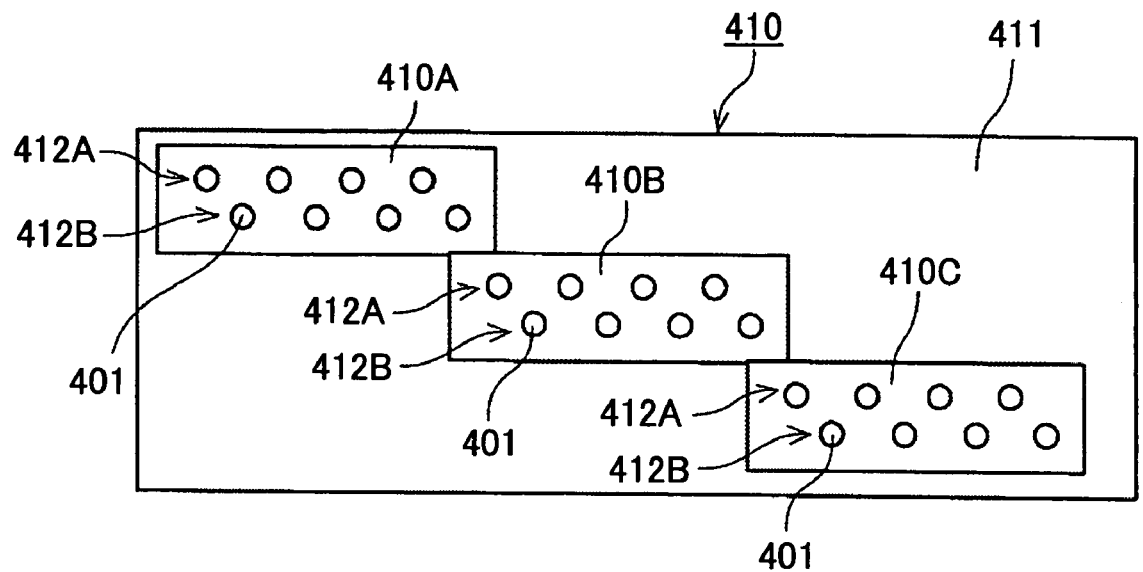
FIG. 10 illustrates yet another example of the liquid discharging head according to the first embodiment of the present invention.

As shown in FIG. 10, a liquid discharging head 410 has plural small-sized (three in this example) liquid discharging heads 410A, 410B, 410C arranged along the sheet width direction on a supporting body 411 in such a manner as to be shifted from one another in the sheet conveying direction so that the total length of the three liquid discharging heads 410A, 410B, 410C correspond to one line. The same effects as the examples shown in FIGS. 8 and 9 can be achieved by providing each of the liquid discharging heads 410A, 410B, and 410C with plural nozzle rows 412A, 412B.

Two nozzle rows are provided in the above examples; however, the present invention is not limited thereto. There can be three or more nozzle rows that are spaced apart by the distance L1.

As described above, the line-type liquid discharging head in this image forming apparatus has plural nozzle rows with plural nozzles used for discharging liquid droplets of the same color. Assuming that the liquid transfer amount impregnating time (time required for liquid to impregnated a standard sheet) is T1 and the sheet conveying speed is V1, the interval (distance) between nozzle rows L1 is expressed as L1=T1×V1. Accordingly, it is possible to ensure that there is sufficient time for liquid such as ink to transfer into a sheet, and thus mitigate the beading phenomenon that is triggered when dots overlap each other.

By making the ink transfer amount impregnating time (time required for ink to impregnate a standard sheet) T1 equal to the time required for pigment-based ink to impregnate commercial/publication-use coated paper, high quality images can be formed on commercial/publication-use coated paper.

As described above, one example of the commercial/publication-use coated paper as recording medium includes a base and a coating layer provided on at least one of the sides of the base, and when measured with a dynamic scanning liquid absorption meter in an environment of 23° C. and 50% RH, the transfer amount of pure water is 4 ml/m$^2$ through 26 ml/m$^2$ during a contact time of 100 ms, and 5 ml/m$^2$ through 29 ml/m$^2$ during a contact time of 400 ms. Another example of the commercial/publication-use coated paper as recording medium includes a base and a coating layer provided on at least one of the sides of the base, and when measured with a dynamic scanning liquid absorption meter in an environment of 23° C. and 50% RH, the transfer amount of recording ink is 4 ml/m$^2$ through 15 ml/m$^2$ during a contact time of 100 ms, and 7 ml/m$^2$ through 20 ml/m$^2$ during a contact time of 400 ms. By employing such commercial/publication-use coated paper, images with increased quality can be formed.

By employing pigment-based ink having surface tension of 15 mN/m or more and 35 mN/m or less, images with increased quality can be formed. Furthermore, if the pigment-based ink includes a fluorochemical surface active agent expressed by the following general formula (A), images with even higher quality can be formed.

With the image forming method performed by the image forming apparatus, an image is formed by discharging liquid droplets from a line-type liquid discharging head including plural nozzle rows with plural nozzles used for discharging liquid droplets of the same color, which nozzle rows are spaced apart by a distance L1, expressed by L1=T1×V1, where T1 is liquid transfer amount impregnating time (time required for liquid to impregnate a standard sheet) and V1 is the sheet conveying speed. Accordingly, it is possible to ensure that there is sufficient time for liquid such as ink to transfer into a sheet, and thus mitigate the beading phenomenon that is triggered when dots overlap each other.

The recorded matter created with the image forming apparatus includes an image formed with dots created by causing liquid droplets to land on a medium. The liquid transfer amount impregnating time of the medium is T1, and adjacent dots in the image are formed by liquid droplets striking the medium at a time difference T, which time difference T is equal to the liquid transfer amount impregnating time T1. Accordingly, it is possible to ensure that there is sufficient time for ink to transfer into a sheet, and thus mitigate the beading phenomenon that is triggered when dots overlap each other so that high-quality recording matter is created.

The recording liquid used as pigment-based ink in the image forming apparatus is discharged as liquid droplets onto a recording medium to form an image. The recording medium includes a base and a coating layer provided on at least one of the sides of the base, and when measured with a dynamic scanning liquid absorption meter in an environment of 23° C. and 50% RH, the transfer amount of pure water is 4 ml/m$^2$ through 26 ml/m$^2$ during a contact time of 100 ms, and 5 ml/m$^2$ through 29 ml/m$^2$ during a contact time of 400 ms. The recording liquid is discharged to form dots in the image, and adjacent dots are formed by discharging liquid droplets at a time difference T that is equal to the liquid transfer amount impregnating time T1 of the recording medium. Accordingly, it is possible to ensure that there is sufficient time for the recording liquid to transfer into a sheet, and thus mitigate the beading phenomenon that is triggered when dots overlap each other.

The recording liquid used as pigment-based ink in the image forming apparatus is discharged as liquid droplets onto a recording medium to form an image. The recording medium includes a base and a coating layer provided on at least one of the sides of the base, and when measured with a dynamic scanning liquid absorption meter in an environment of 23° C.

and 50% RH, the transfer amount of recording ink is 4 ml/m² through 15 ml/m² during a contact time of 100 ms, and 7 ml/m² through 20 ml/m² during a contact time of 400 ms. The recording liquid is discharged to form dots in the image, and adjacent dots are formed by discharging liquid droplets at a time difference T that is equal to the liquid transfer amount impregnating time T1 of the recording medium. Accordingly, it is possible to ensure that there is sufficient time for the recording liquid to transfer into a sheet, and thus mitigate the beading phenomenon that is triggered when dots overlap each other.

Figure 11:
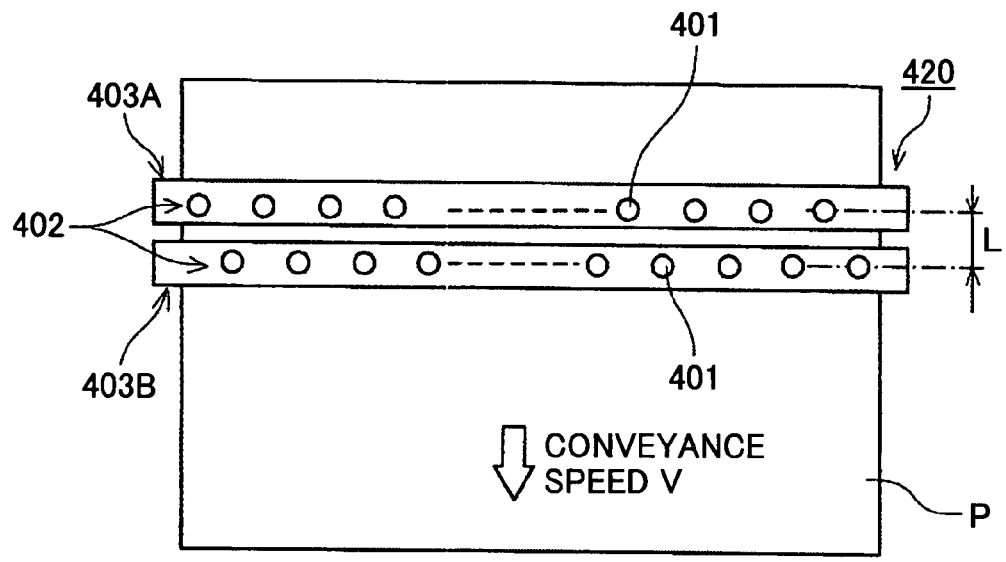
FIG. 11 illustrates one example of a liquid discharging head according to a second embodiment of the present invention.
Figure 12:
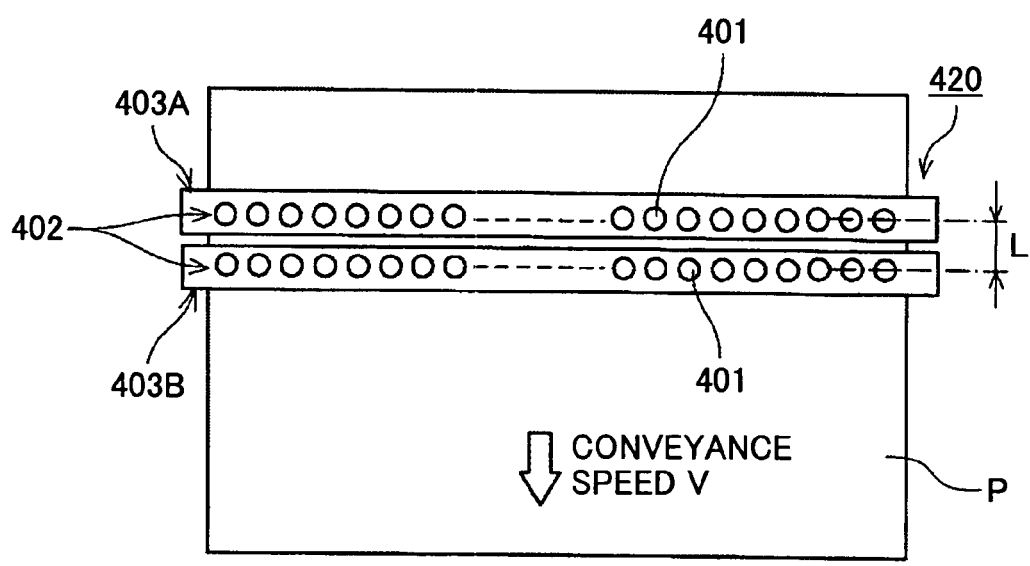
FIG. 12 illustrates another example of the liquid discharging head according to the second embodiment of the present invention.

Next, a second embodiment of the present invention is described with reference to FIGS. 11 and 12. FIGS. 11 and 12 illustrate different examples of a liquid discharging head according to the same embodiment.

The second embodiment is relevant to the above structure (2). A line-type liquid discharging head 420 has head units 403A, 403B each including a nozzle row 402 with plural nozzles 401 arranged for discharging liquid droplets.

In the example shown in FIG. 11, the nozzles 401 (e.g., odd numbered nozzles) of the head unit 403A and the nozzles 401 (e.g., even numbered nozzles) of the head unit 403B are arranged in a staggered fashion. By using the nozzles 401 in both head units 403A, 403B, a desired resolution level can be achieved in the sheet width direction.

In the example shown in FIG. 12, the nozzles 401 of the head unit 403A and the nozzles 401 of the head unit 403B are arranged at overlapping positions (i.e., aligned with each other) in the sheet conveying direction. By using the nozzles 401 in either one of the head units 403A, 403B, a desired resolution level can be achieved in the sheet width direction.

In such configurations, similar to the first embodiment, the time difference T occurs between the timing at which the nozzles 401 of the head unit 403A discharge liquid droplets and the timing at which the nozzles 401 of the head unit 403B discharge liquid droplets. Thus, a beating phenomenon can be mitigated by specifying a distance between the head units in such a manner that the time difference T becomes equal to the transfer amount impregnating time of a sheet.

Specifically, a distance L11 between the two head units 403A and 403B of the liquid discharging head 420 is obtained by the following formula.

$$L11 = T1 \times V1$$

V1: Sheet conveying speed

T1: Ink transfer amount impregnating time (time required for ink to impregnate a standard sheet)

In the head unit arrangement shown in FIG. 11, the head units 403A, 403B of the liquid discharging head 420 are arranged in such a manner that nozzles adjacent to each other belong to different head units. Therefore, all of the nozzles 401 of the head units 403A, 403B are used for liquid droplets of the same color. Meanwhile, in the head unit arrangement shown in FIG. 12, the nozzles 401 of the head unit 403A and the nozzles 401 of the head unit 403B of the liquid discharging head 420 are arranged at overlapping positions (aligned with each other). Therefore, alternate nozzles in each of the head units 403A, 403B are used for liquid droplets of the same color.

With the configuration shown in FIG. 12, a desired resolution level can be achieved with a single head unit. Accordingly, when using paper that does not require a mechanism of mitigating the beading phenomenon, the head units 403A, 403B can be used alternately, so as to alleviate the work load on the heads.

The above-described image forming apparatus and line-type liquid discharging head includes plural head units with nozzle rows including plural nozzles used for discharging liquid droplets of the same color. Assuming that the liquid transfer amount impregnating time (time required for liquid to impregnate a standard sheet) is T1 and the sheet conveying speed is V1, the interval (distance) between head units L11 is expressed as L11=T1×V1. Accordingly, it is possible to ensure that there is sufficient time for liquid such as ink to transfer into a sheet, and thus mitigate the beading phenomenon that is triggered when dots overlap each other.

With the image forming method performed by the image forming apparatus, an image is formed by discharging liquid droplets from a line-type liquid discharging head including plural head units each provided with a nozzle row including plural nozzles used for discharging liquid droplets of the same color, which head units are spaced apart by a distance L11, expressed by L11=T1×V1, where T1 is liquid transfer amount impregnating time (time required for liquid to impregnate a standard sheet) and V1 is the sheet conveying speed. Accordingly, it is possible to ensure that there is sufficient time for liquid such as ink to transfer into a sheet, and thus mitigate the beading phenomenon that is triggered when dots overlap each other.

Next, another example of the second embodiment is described. As described above, by dividing the nozzles into head units, a mechanism for changing (adjusting) the interval between the head units (distance between the head units) can be provided. Depending on the type of paper being used, the ink transfer amount impregnating time (time required for liquid to impregnate a standard sheet) is different. With this mechanism, there is no need to redesign a different liquid discharging head for each type of paper, and optimum recording conditions for plural types of paper can be specified in a single image forming apparatus.

The distance between head units L11 appropriate for a standard sheet can be corrected by calculating a distance between head units L12 appropriate for a sheet to be used based on transfer amount impregnating time T2 of the sheet to be used.

Specifically, if the ink transfer amount impregnating time T2 of the sheet to be used is different from the ink transfer amount impregnating time T1 of the standard sheet, the distance between head units L11 is changed (adjusted) to the distance between head units L12 calculated as follows (the changed distance between head units is referred to as "adjusted distance between head units).

$$L12 = L111 \times (T1/T2)$$

L11: Distance between head units when using standard sheet

L12: Adjusted distance between head units

T1: ink transfer amount impregnating time of standard sheet

T2: ink transfer amount impregnating time of sheet to be used

An example of the mechanism for changing (adjusting) the interval between head units is described as follows. In the head configuration shown in FIG. 11 or FIG. 12, the head unit 403B can be configured to be movable along the sheet conveying direction, and be provided with a moving mechanism realized by a combination of a rack and a pinion or an eccentric cam. The head unit 403B can be moved along the sheet conveying direction (forward and backward) relative to the head unit 403A, so that the distance between the head units becomes the calculated distance between head units L12.

Next, yet another example of the second embodiment is described. In the second embodiment, the recording speed can be increased if the distance between the unit heads L can be adjusted to a large distance. If the recording speed is increased, the sheet conveying speed can be increased, and the head driving frequency can also be increased.

Specifically, when the interval between the head units 403A and 403B is adjusted to an interval L3 that is larger than or equal to an interval L2 corresponding to the liquid transfer amount impregnating time T2 of the sheet to be used, the following changes can also be made. That is, a sheet conveying speed V2 for the sheet to be used can be increased to a sheet conveying speed V3 that is faster than the sheet conveying speed V2. Furthermore, a head driving frequency f2 for the sheet to be used can be increased to a head driving frequency f3 that is higher than the head driving frequency f2.

That is, when L3>L2 is satisfied, V3>V2 and f3>f2 can be satisfied, where L3 is the adjusted head unit interval, V3, is the adjusted conveying speed, and f3 is the adjusted head driving frequency.

Next, a third embodiment of the present invention is described. The third embodiment is relevant to the above structure (3). In the structure (3), the practical recording speed decreases, and is thus preferably combined with the structures (1) or (2). Specifically, by decreasing the recording speed, the distance between nozzles L can be reduced, and thus reduce the size and cost of the image forming apparatus.

In the third embodiment, the recording speed is decreased, which means decreasing the sheet conveying speed and decreasing the heat driving frequency in synchronization.

Therefore, in the liquid discharging head 400 according to the first embodiment and in the liquid discharging head 420 according to the second embodiment, according to the liquid transfer amount impregnating time T2 of the sheet to be used, the sheet conveying speed V2 for the sheet to be used and the head driving frequency f2 for the sheet to be used can be changed (adjusted) as follows) (the changed sheet conveying speed is referred to as "adjusted conveying speed" and the changed head driving frequency is referred to as "adjusted head driving frequency").

$$V2=(T2/T1) \times V1$$

$$f2=(T2/T1) \times f1$$

V1: Sheet conveying speed of standard sheet

V2: Adjusted sheet conveying speed f1: Head driving frequency of standard sheet f2: Adjusted head driving frequency T1: Ink transfer amount impregnating time of standard sheet T2: Adjusted ink transfer amount impregnating time It is assumed that the liquid transfer amount impregnating time of a standard sheet is T1, the sheet conveying speed of a standard sheet is V1, and the head driving frequency when forming an image on a standard sheet is f1. According to the liquid transfer amount impregnating time of a sheet to be used T2, the sheet conveying speed V2 of the sheet to be used is calculated by V2=V1×(T2/T1) and the head driving frequency f2 of the sheet to be used is calculated by f2=f1×(T2/T1). Accordingly, it is possible to ensure that there is sufficient time for liquid such as ink to transfer into a sheet, and thus mitigate the beading phenomenon that is triggered when dots overlap each other.

Next a configuration for improving fixing properties is described with reference to FIGS. 13 and 14.

As shown in FIG. 13, when forming an image with a head H including an arrangement of nozzles N, the positions of the nozzles N determine the positions of the dots. If the recording positions are aligned in both vertical and horizontal directions, the diameter of each dot D needs to be at least $\sqrt{2}$ times or more of the resolution in order to fill a solid image.

Meanwhile, as shown in FIG. 14, if the recording positions are shifted by half the resolution in the sheet conveying direction with respect to adjacent recording positions to be recorded by an adjacent nozzle N, the diameter of each dot D can be relatively small compared to the example shown in FIG. 13. In the example shown in FIG. 14, C1-C4 represent dot positions. The dot positions C2 and C4 are shifted by half the resolution in the sheet conveying direction with respect to the dot positions C1 and C3.

Because the dot diameter can be reduced, the area of a dot overlapping an adjacent dot can be reduced. Furthermore, the amount of ink droplets can be reduced so that less time is required for the ink to dry, thus improving fixing properties. By using this structure in combination with the aforementioned structures, a beading phenomenon can be further mitigated.

In the example of adjusting the distance between head units (second embodiment) or the example of adjusting the sheet conveying speed and the head driving frequency (third embodiment) according to the ink transfer amount impregnating time of the sheet to be used, it is possible select whether the adjustment is to be made. For example, when using sheets that require short transfer amount impregnating time (i.e., has high permeability), sufficient recording quality can be achieved with the default setup for standard sheets. In this case, it can be selected not to make the aforementioned adjustments.

Furthermore, it is possible to provide a device for specifying, from the printer driver on the host side, the sheet type or a device for detecting the sheet type to be used. Accordingly, the distance between the head units can be adjusted or the sheet conveying speed and the head driving frequency can be adjusted based on the sheet type specified from outside or the detected sheet type.

Figure 15:
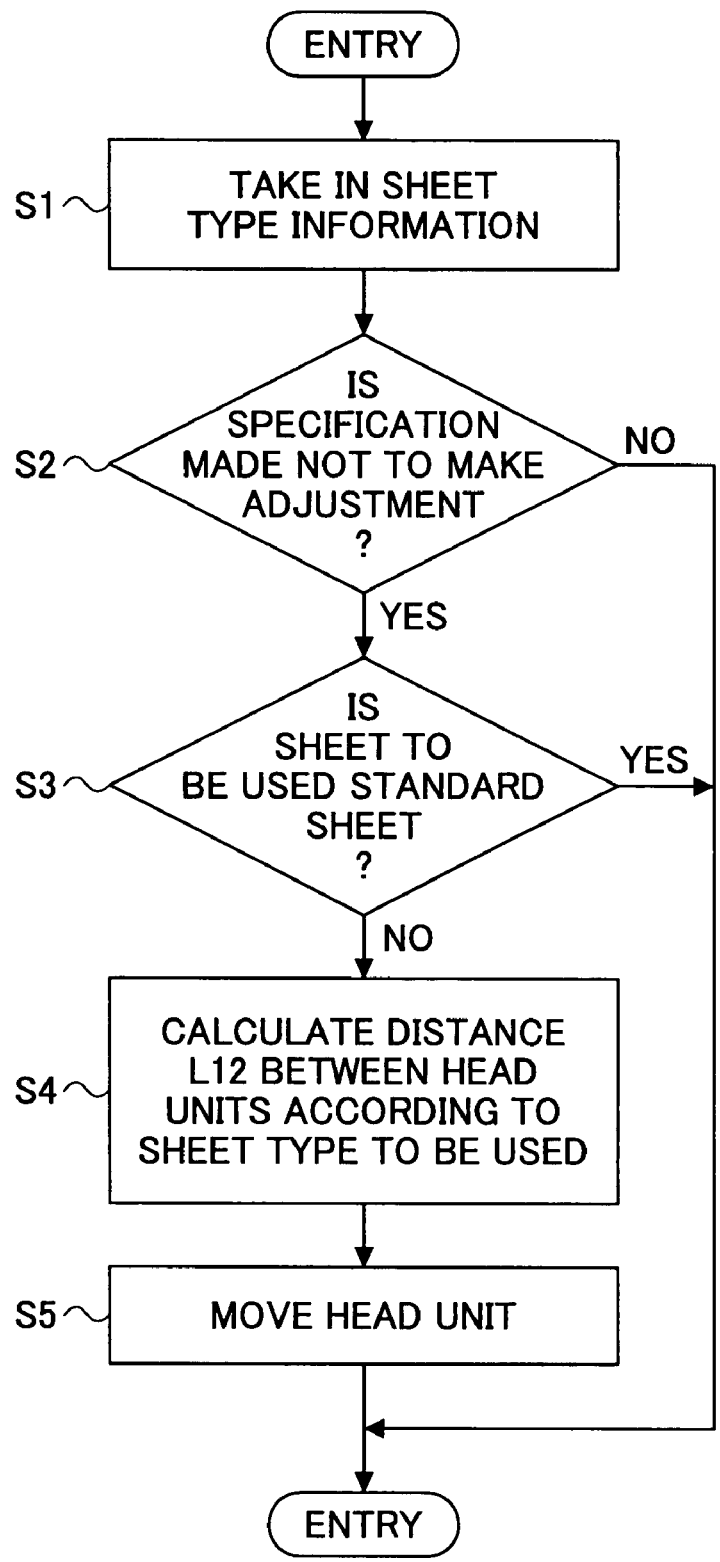
FIG. 15 is a flowchart of a process for specifying or automatically detecting whether to adjust the distance between the head units.

An example of a process for specifying or automatically detecting whether to adjust the distance between the head units is described with reference to FIG. 15.

In this process, step S1 is performed to take in sheet type information specified at the printer driver on the host side or sheet type information detected by a sheet type detecting unit provided in the main unit of the image forming apparatus. Then, in step S2, it is determined whether a specification is made not to adjust the distance between the head units, which specification is made by the printer driver on the host side or by a selecting unit provided in an operations panel of the main unit of the image forming apparatus.

When a specification is made not to adjust the distance (Yes in step S2), it is determined whether the sheet to be used is a standard sheet (step S3). If the sheet to be used is not a standard sheet (No in step S3), step S4 is performed to read the ink transfer amount impregnating time corresponding to the sheet type to be used, which time is stored in a memory (storing unit) beforehand, and calculate the distance L12 between head units using the formula L12=(T2/T1)×L11. Step S5 is performed to drive a moving driving mechanism of a predetermined head unit to move the predetermined head unit to a position where the distance between head units matches the distance L12 calculated in step S4.

Adjustment of the sheet conveying speed or the head driving frequency can also be performed by a similar process.

In the above embodiments, commercial/publication-use coated paper is used as the standard sheet; however, the present invention is not limited thereto. Any other type of sheet can be used as the standard sheet.

With regard to ink, the ink prescribed as above does not necessarily need to be used. The beading phenomenon may be mitigated by using conventional ink, although extra adjustments may be required.

Next, a description is given of an embodiment employing a serial-type image forming apparatus instead of the line-type image forming apparatus.

The structure (3) described above can be applied not only to a line-type image forming apparatus but also a serial-type image forming apparatus.

Figure 16:
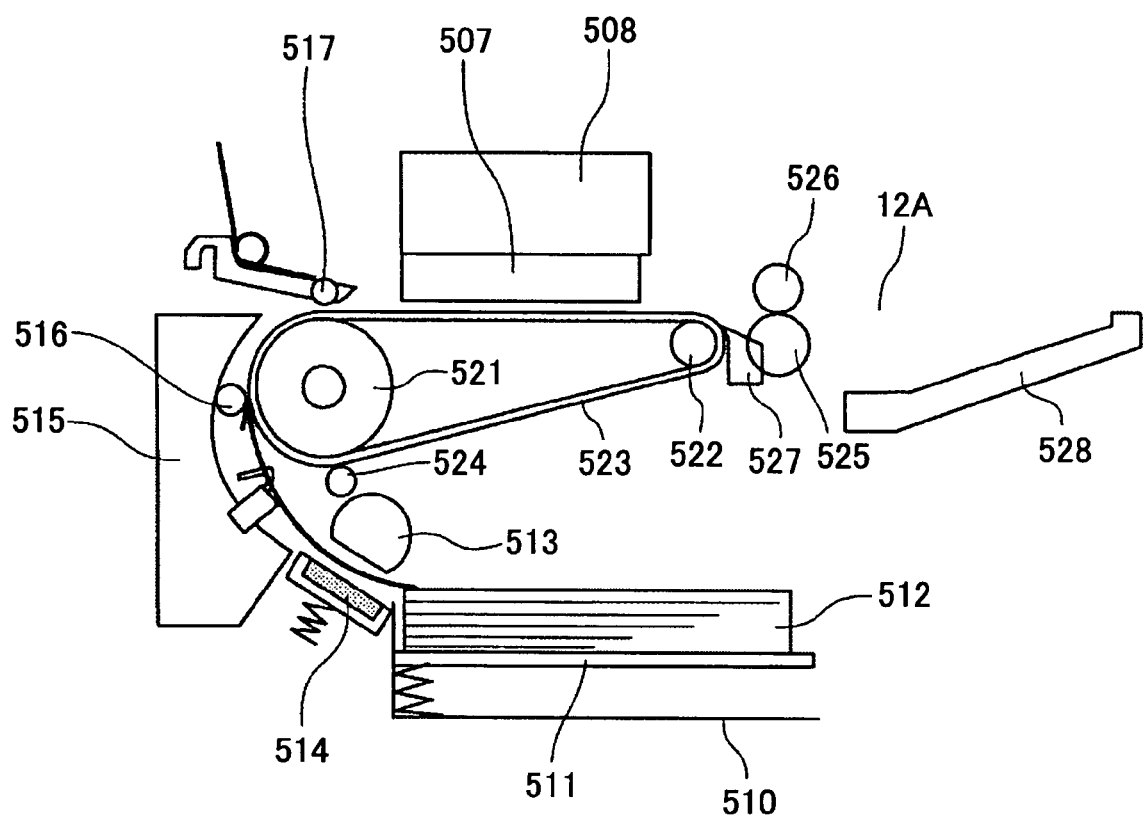
FIG. 16 is a schematic diagram of a serial-type inkjet recording apparatus.

An example of a serial-type inkjet recording apparatus is described with reference to FIGS. 16 and 17. FIG. 16 is a schematic diagram of the overall configuration of the apparatus and FIG. 17 is a plan view of relevant parts of the apparatus.

Figure 17:
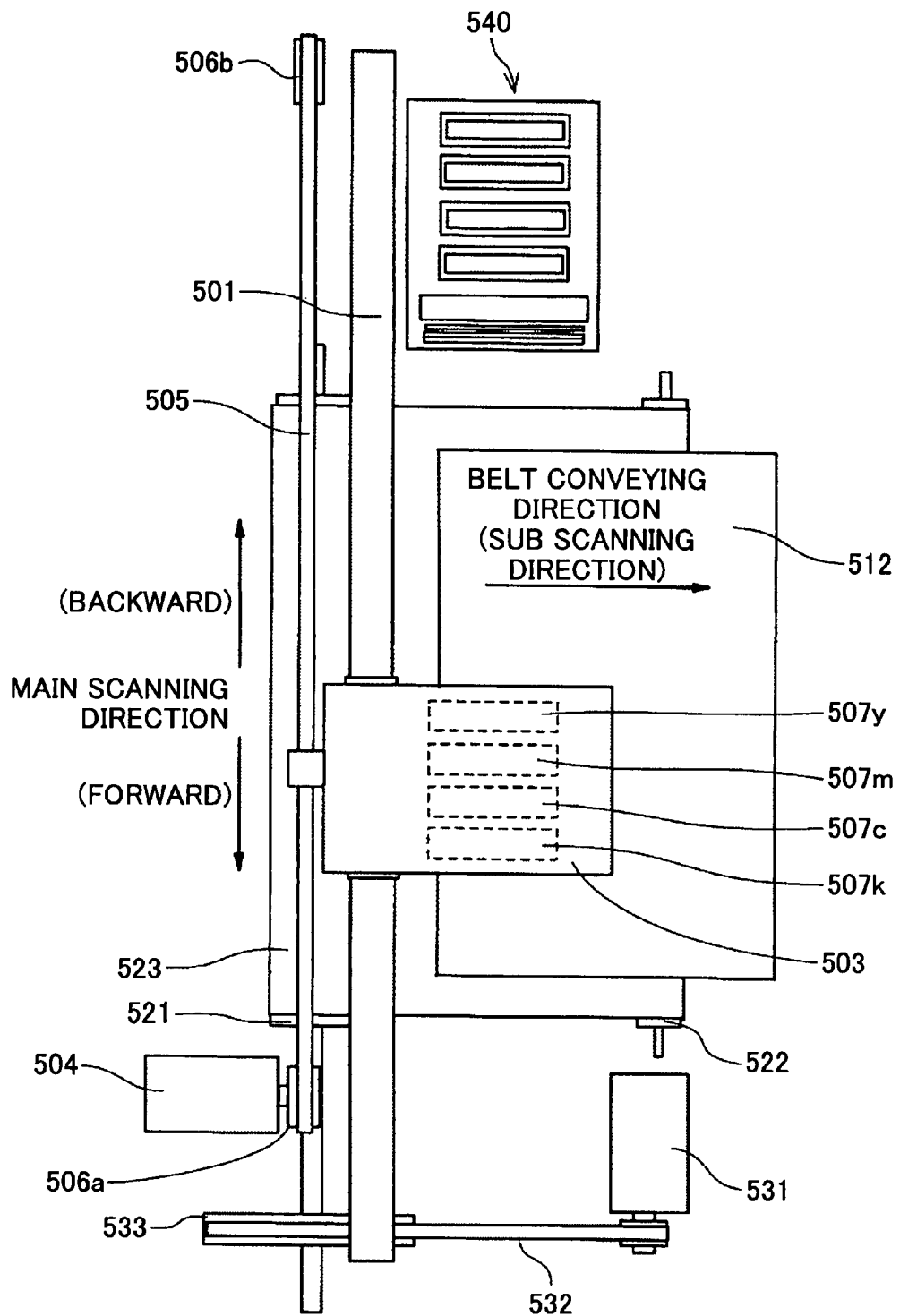
FIG. 17 is a plan view of relevant parts of the serial-type inkjet recording apparatus shown in FIG. 16.

As shown in FIG. 17, in this image forming apparatus, a guide rod 501, which is a guide member arranged across a horizontal direction between left and right side plates (not shown), and a not shown guide stay hold a carriage 503 in such a manner as to be slidable in the main scanning direction. A main scanning motor 504 moves/scans the carriage 503 in directions indicated by arrows in FIG. 17 (main scanning direction) via a timing belt 505 stretched across a driving pulley 506a and a following pulley 506b.

The carriage 503 includes recording heads 507k, 507c, 507m, and 507y (referred to as "recording heads 507" when the color is not distinguished), which are four liquid discharging heads that discharge ink droplets of yellow (Y), cyan (C), magenta (M), and black (Bk). The recording heads 507 are arranged in such a manner that plural ink discharging outlets (nozzles) are aligned in a direction (sub scanning direction) intersecting the main scanning direction, with the ink droplet discharging direction facing downward. As described in the embodiment employing the line-type liquid discharging heads, each head has two nozzle rows with plural nozzles arranged in each row. The carriage 503 is provided with sub tanks 508 corresponding to each color, from which ink of each color is supplied to the recording heads 507. Ink is supplied to the sub tanks 508 from a main tank (ink cartridge) via a not shown ink supplying tube.

Meanwhile, a sheet feeding unit is provided for feeding sheets 512 stacked on a sheet stacking unit 511 (platen) of a sheet feeding tray 510. Specifically, a semicircular roller (feeding roller) 513 separates and feeds out one sheet at a time from the sheets 512 stacked on the sheet stacking unit 511. A separating pad 514 made of a material with a high frictional coefficient is provided facing the semicircular roller 513, and the separating pad 514 is pressed toward the semicircular roller 513.

The sheet 512 fed from the sheet feeding unit is guided upward by a conveying guide 515 and sent in between a conveying belt 523 and a resist roller 516. The conveying belt 523 is wound around a conveying roller 521 and a following roller 522. Then, the sheet 512 moving direction is changed by substantially 90 degrees, pressed by a pressing roller 517 onto the conveying belt 523, and conveyed while being electrostatically attracted on the conveying belt 523.

The conveying belt 523 is provided with electric charges by a charging roller 524. The conveying belt 523 is driven as a sub scanning motor 531 rotates the conveying roller 521 via a timing belt 532 and a timing roller 533.

On the downstream side of an image forming area of the recording heads 507, there are arranged a sheet ejecting roller 525, a sheet pressing roller 526 such as a spur, and a separating claw 527. The sheets 512 ejected from between the sheet ejecting roller 525 and the sheet pressing roller 526 are stacked onto a sheet eject stack tray 528.

In the non-printing area of the carriage 503, a maintenance/recovery mechanism 540 is provided for maintaining and recovering the reliability (operability) of the recording heads 507.

In the serial-type image forming apparatus, the sheet 512 is intermittently conveyed by the conveying belt 523. The carriage 503 is moved/scanned in the main scanning direction while liquid droplets are discharged from the recording heads 507 to record one line of the image, which line extends orthogonal to the sheet conveying direction. When recording for one line is completed, the sheet 512 is conveyed by a predetermined amount. This operation is repeated until a full image is formed on the sheet 512.

By adjusting the scanning speed (moving speed) of the carriage 503 in this serial-type image forming apparatus, i.e., by waiting until the ink transfer amount impregnating time of a dot passes before an adjacent dot strikes, it is possible to mitigate the beading phenomenon.

The adjusted main scanning speed of the carriage 503 can be calculated by the following formula.

$$U2=(T2/T1){\times}U1$$

$$f2=(T2/T1){\times}f1$$

U1: Head unit scanning speed for the standard sheet

U2: Adjusted scanning speed f1: Head driving frequency of the standard sheet f2: Adjusted head driving frequency T1: Ink transfer amount impregnating time of the standard sheet T2: Ink transfer amount impregnating time of the sheet to be used In this manner, an image forming apparatus is provided with liquid discharge heads including nozzles for discharging liquid droplets aligned in a sheet conveying direction. The liquid discharge heads perform a scanning operation in a direction orthogonal to the sheet conveying direction. Assuming that the liquid transfer amount impregnating time of a standard sheet is T1, the head scanning speed for a standard sheet is U1, and the head driving frequency when forming an image on a standard sheet is f1, the head scanning speed U2 for the sheet to be used is changed to $U2=U1{\times}(T2/T1)$ and the head driving frequency f2 is changed to $f2=f1{\times}(T2/T1)$, according to the liquid transfer amount impregnating time of the sheet to be used. Accordingly, it is possible to ensure that there is sufficient time for liquid such as ink to transfer into a sheet, and thus mitigate the beading phenomenon that is triggered when dots overlap each other.

In this embodiment, it is possible select whether the adjustment is to be made based on the sheet type specified from outside or the detected sheet type.

The present invention is not limited to the specifically disclosed embodiment, and variations and modifications may be made without departing from the scope of the present invention.

The present application is based on Japanese Priority Patent Application No. 2006-202210, filed on Jul. 25, 2006, Japanese Priority Patent Application No. 2006-254493, filed on Sep. 20, 2006, and Japanese Priority Patent Application No. 2006-302451, filed on Nov. 8, 2006, the entire contents of which are hereby incorporated by reference.

What is claimed is:

1. An image forming apparatus comprising:
a line-type liquid discharging head comprising nozzles configured to jet liquid droplets, the nozzles being aligned in a sheet width direction,
wherein:
the line-type liquid discharging head comprises plural nozzle rows each comprising an alignment of a plurality of the nozzles configured to jet liquid droplets of the same color; and
a distance L1 between the nozzle rows is $L1=T1 \times V1$, where T1 is a liquid transfer amount impregnating time of a standard sheet and V1 is a sheet conveying speed.

2. The image forming apparatus according to claim 1, wherein:
the line-type liquid discharging head comprises plural head units each comprising one of the nozzle rows, each of the nozzle rows comprising an alignment of a plurality of the nozzles configured to jet liquid droplets of the same color; and
a distance L11 between the head units is $L11=T1 \times V1$, where T1 is the liquid transfer amount impregnating time of the standard sheet and V1 is the sheet conveying speed.

3. The image forming apparatus according to claim 2, wherein:
a change is made such that the distance L11 between the head units is changed to a distance L12 ($L12=L11 \times (T1/T2)$) in the event that a liquid transfer amount impregnating time T2 of a sheet to be used is different from the liquid transfer amount impregnating time T1 of the standard sheet.

4. The image forming apparatus according to claim 3, wherein:
in the event that the distance L12 between the head units, which distance L12 corresponds to the liquid transfer amount impregnating time T2 of the sheet to be used, is changed to a distance L13 that is longer than the distance L12, changes are made such that a sheet conveying speed V2 applied to the speed to be used is changed to a sheet conveying V3 that is higher than the sheet conveying speed V2 and a head driving frequency f2 applied to the sheet to be used is changed to a head driving frequency f3 that is higher than the head driving frequency f2.

5. The image forming apparatus according to claim 3, wherein:
the change is made according to a sheet type specified from the outside or a detected sheet type.

6. The image forming apparatus according to claim 1, wherein:
changes are made such that a sheet conveying speed V2 applied to a sheet to be used is determined such that $V2=V1 \times (T2/T1)$ and a head driving frequency f2 applied to the sheet to be used is determined such that $f2=f1 \times (T2/T1)$ according to a liquid transfer amount impregnating time T2 of the sheet to be used, where T1 is a liquid transfer amount impregnating time of a standard sheet, V1 is a sheet conveying speed applied to the standard sheet, and f1 is a head driving frequency applied for forming an image on the standard sheet.

7. The image forming apparatus according to claim 1, wherein:
the nozzles are aligned in a sheet conveying direction and the liquid discharging head is configured to be scanned in a direction orthogonal to the sheet conveying direction, wherein:
changes are made such that a liquid discharging head scanning speed U2 applied to a sheet to be used is determined such that $U2=U1 \times (T2/T1)$ and a head driving frequency f2 applied to the sheet to be used is determined such that $f2=f1 \times (T2/T1)$ according to a liquid transfer amount impregnating time T2 of the sheet to be used, where T1 is a liquid transfer amount impregnating time of a standard sheet, U1 is a liquid discharging head scanning speed applied to the standard sheet, and f1 is a head driving frequency applied for forming an image on the standard sheet.

8. The image forming apparatus according to claim 1, wherein:
the liquid transfer amount impregnating time T1 of the standard sheet corresponds to time required for pigment-based ink to impregnate commercial/publication-use coated paper.

9. The image forming apparatus according to claim 8, wherein:
the commercial/publication-use coated paper comprises a recording medium comprising a base and a coating layer coating at least one side of the base;
and a transfer amount of pure water into the recording medium falls in a range of 4 ml/m$^2$ through 26 ml/m$^2$ during a contact time of 100 ms and a transfer amount of pure water into the recording medium falls in a range of 5 ml/m$^2$ through 29 ml/m$^2$ during a contact time of 400 ms, as measured with a dynamic scanning liquid absorption meter under the conditions of 23° C. and 50% RH.

10. The image forming apparatus according to claim 8, wherein:
the commercial/publication-use coated paper comprises a recording medium comprising a base and a coating layer coating at least one side of the base;
and a transfer amount of recording liquid into the recording medium falls in a range of 4 ml/m$^2$ through 15 ml/m$^2$ during a contact time of 100 ms and a transfer amount of recording liquid into the recording medium falls in a range of 7 ml/m$^2$ through 20 ml/m$^2$ during a contact time of 400 ms, as measured with a dynamic scanning liquid absorption meter under the conditions of 23° C. and 50% RH.

11. The image forming apparatus according to claim 8, wherein:
surface tension of the pigment-based ink is 15 mN/m or more and 35 mN/m or less.

12. The image forming apparatus according to claim 8, wherein:
the pigment-based ink comprises a fluorochemical surface active agent expressed by the following general formula (A), where m represents an integer number that falls in a range of 0 through 10 and n represents an integer number that falls in a range of 0 through 40.

13. The image forming apparatus according to claim 1, wherein:
dot rows comprising an alignment of dots extending in a recording direction are recorded as the nozzles jet the liquid droplets; and
the dot rows are recorded in such a manner that recording positions of odd numbered dot rows and recording positions of even numbered dot rows are shifted from each other by half a resolution in the recording direction.

14. The image forming apparatus according to claim 13, wherein:
the dot rows are recorded in such a manner as to be shifted from each other by half a resolution according to a sheet type specified from the outside or a detected sheet type.

15. The image forming apparatus according to claim 1, wherein each droplet jetted from the discharging head onto the standard sheet proceeds to permeate into the standard sheet, and the liquid transfer amount impregnating time represents an amount of time until the permeation process recedes.

16. An image forming method of forming an image using a line-type liquid discharging head comprising nozzles configured to jet liquid droplets, the nozzles being aligned in a sheet width direction, the image forming method comprising the step of:

forming the image by using the line-type liquid discharging head comprising plural nozzle rows each comprising an alignment of a plurality of the nozzles configured to jet liquid droplets of the same color, wherein:

a distance L1 between the nozzle rows is $L1=T1 \times V1$, where T1 is a liquid transfer amount impregnating time of a standard sheet and V1 is a sheet conveying speed.

17. The image forming method according to claim 15, the image forming method comprising the step of:

forming the image by using the line-type liquid discharging head comprising plural head units each comprising a nozzle row comprising an alignment of a plurality of the nozzles configured to jet liquid droplets of the same color, wherein:

a distance L11 between the head units is $L11=T1 \times V1$, where T1 is the liquid transfer amount impregnating time of the standard sheet and V1 is the sheet conveying speed.

18. The image forming method according to claim 17, further comprising the step of:

making a change such that the distance L11 between the head units is changed to a distance L12 ($L12=L11 \times (T1/T2)$) in the event that a liquid transfer amount impregnating time T2 of a sheet to be used is different from the liquid transfer amount impregnating time T1 of the standard sheet.

19. The image forming method according to claim 18, further comprising the step of:

making changes such that a sheet conveying speed V2 applied to the sheet to be used is changed to a sheet conveying speed V3 that is higher than the sheet conveying speed V2 and a head driving frequency f2 applied to the sheet to be used is changed to a head driving frequency f3 that is higher than the head driving frequency f2, in the event that the distance L12 between the head units, which distance L12 corresponds to the liquid transfer amount impregnating time T2 of the sheet to be used, is changed to a distance L13 that is longer than the distance L12.

20. The image forming method according to claim 16, the image forming method comprising the step of:

making changes such that a sheet conveying speed V2 applied to a sheet to be used is determined such that $V2=V1 \times (T2/T1)$ and a head driving frequency f2 applied to the sheet to be used is determined such that $f2=f1 \times (T2/T1)$ according to a liquid transfer amount impregnating time T2 of the sheet to be used, where T1 is a liquid transfer amount impregnating time of standard sheet, V1 is a sheet conveying speed applied to the standard sheet, and f1 is a head driving frequency applied for forming an image on the standard sheet.

21. The image forming method according to claim 16, wherein the nozzles are aligned in a sheet conveying direction and the liquid discharging head is configured to be scanned in a direction orthogonal to the sheet conveying direction, the image forming method comprising the step of:

making changes such that a liquid discharging head scanning speed U2 applied to a sheet to be used is determined such that $U2=U1 \times (T2/T1)$ and a head driving frequency f2 applied to the sheet to be used is determined such that $f2=f1 \times (T2/T1)$ according to a liquid transfer amount impregnating time T2 of the sheet to be used, where T1 is a liquid transfer amount impregnating time of a standard sheet, U1 is a liquid discharging head scanning speed applied to the standard sheet, and f1 is a head driving frequency applied for forming an image on the standard sheet.

* * * * *